US012092986B2

(12) United States Patent
Teshima et al.

(10) Patent No.: US 12,092,986 B2
(45) Date of Patent: Sep. 17, 2024

(54) IMAGE FORMING APPARATUS

(71) Applicant: CANON KABUSHIKI KAISHA, Tokyo (JP)

(72) Inventors: Eiichiro Teshima, Kawasaki (JP); Yoshiteru Kaida, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/340,305

(22) Filed: Jun. 23, 2023

(65) Prior Publication Data

US 2023/0333506 A1 Oct. 19, 2023

Related U.S. Application Data

(63) Continuation of application No. 17/518,084, filed on Nov. 3, 2021, now Pat. No. 11,726,427, which is a continuation of application No. 16/284,447, filed on Feb. 25, 2019, now Pat. No. 11,194,283.

(30) Foreign Application Priority Data

Feb. 28, 2018 (JP) ................................ 2018-034928

(51) Int. Cl.
*G03G 21/16* (2006.01)

(52) U.S. Cl.
CPC ..... *G03G 21/1633* (2013.01); *G03G 21/1647* (2013.01); *G03G 21/1676* (2013.01); *G03G 2221/1654* (2013.01)

(58) Field of Classification Search
CPC ........... G03G 21/1633; G03G 21/1647; G03G 21/1676; G03G 2221/1654
See application file for complete search history.

(56) References Cited

U.S. PATENT DOCUMENTS

| | | | | |
|---|---|---|---|---|
| 6,954,596 | B2 | 10/2005 | Saito et al. | |
| 7,076,179 | B2 | 7/2006 | Nakazato | |
| 8,396,379 | B2 * | 3/2013 | Tsukijima | G03G 15/0865 399/262 |
| 8,437,648 | B2 | 5/2013 | Tachibana | |
| 8,509,651 | B2 | 8/2013 | Tsukijima | |
| 2003/0133719 | A1 | 7/2003 | Tsuruya et al. | |
| 2006/0008289 | A1 | 1/2006 | Sato et al. | |
| 2006/0285859 | A1 | 12/2006 | Cook | |
| 2010/0272452 | A1 | 10/2010 | Tsukijima | |
| 2011/0058825 | A1 | 3/2011 | Tsukijima | |
| 2019/0265636 | A1 * | 8/2019 | Teshima | G03G 21/1676 |

FOREIGN PATENT DOCUMENTS

| | | | |
|---|---|---|---|
| JP | 2004-286948 | A | 10/2004 |
| JP | 2005-091462 | A | 4/2005 |
| JP | 2011-008142 | A | 1/2011 |
| JP | 2011-059296 | A | 3/2011 |
| JP | 2011-175181 | A | 9/2011 |

OTHER PUBLICATIONS

Office Action dated Feb. 8, 2022, in Japanese Patent Application No. 2018-034928.

* cited by examiner

*Primary Examiner* — Victor Verbitsky
(74) *Attorney, Agent, or Firm* — Venable LLP

(57) ABSTRACT

In a case in which an image forming apparatus determines that a replaceable unit is replaced in a first state, in which removal of the replaceable unit is inhibited, the image forming apparatus performs control to switch from the first state to a second state, in which removal of the replaceable unit is allowed.

9 Claims, 15 Drawing Sheets

IMAGE FORMING APPARATUS

BACKGROUND OF THE INVENTION

Field of the Invention

The present invention relates to an electrophotographic or electrostatic-recording image forming apparatus, for example a copier or a printer.

Description of the Related Art

In a color image forming apparatus, light beams emitted from optical devices independently scan respective photoconductors, on which development units then form toner images of respective colors. The toner images of the respective colors formed on the photoconductors are layered on an intermediate transfer belt to be eventually transferred onto a sheet, or layered on a transfer member on the belt to be eventually transferred onto a sheet. This tandem scheme is conventionally used to form color images. Some tandem-type color image forming apparatuses employ process cartridges; each is an integrated cartridge containing an image forming unit, including a photoconductor and a toner image forming unit such as a development unit. The integrated process cartridges are arranged in a row removably from the image forming apparatus body. For an image forming apparatus having such process cartridges, a user may replace any of the process cartridges without relying on a serviceman, for example when the cartridge runs out of a developer. This allows image forming to be continued, and also improves maintainability because other supplies such as a photoconductor can be replaced at the same time.

With environmental considerations, various techniques for image forming apparatuses have been proposed for finishing up a process cartridge that includes a toner container. For example, a technique has been disclosed in which, only when the right time to replace a process cartridge is detected, a stopper for the process cartridge is disabled (released) to allow the process cartridge to be removed (see Japanese Patent Application Laid-Open No. 2005-091462). A technique has also been disclosed that uses a locking unit for locking the cover of a toner container, and a unit for detecting the out-of-toner state of the toner container (see Japanese Patent Application Laid-Open No. 2011-008142). In this configuration, at the occurrence of the out-of-toner state of the toner container, the cover of the toner container can be unlocked by a user operation to allow the toner container to be replaced.

Unfortunately, image forming apparatuses in such conventional examples have the following problems. Such an apparatus includes a locking mechanism that locks the cartridges for inhibiting the replacement of the cartridges until the toner in the cartridges is finished up. However, it is conceivable that a still-usable cartridge may be removed from the apparatus and replaced with a new cartridge due to causes such as a malfunction of the locking mechanism or a user disabling the locking mechanism. The removed, still-usable cartridge has toner remaining inside. Also, since the locking mechanism is not released and the cartridge remains locked after the replacement, it may not be possible to reinsert the original cartridge removed in the middle of use and finish up the toner in the original cartridge. Thus, improvement in usability related to the locking mechanism for replaceable units, for example, cartridges, is desired.

SUMMARY OF THE INVENTION

An aspect of the present invention is an image forming apparatus configured to form an image on a recording material, including a unit replaceable with regard to the image forming apparatus, a switching unit configured to switch a state of the unit between a first state and a second state, wherein the first state is a state in which removal of the unit from the image forming apparatus is inhibited and the second state is a state in which removal of the unit from the image forming apparatus is allowed, and a control unit configured to control the switching unit, wherein in a case where the control unit determines that the unit is replaced while the unit is in the first state, the control unit controls the switching unit to switch a state of the unit from the first state to the second state.

Another aspect of the present invention is an image forming apparatus configured to form an image on a recording material, including a unit replaceable with regard to the image forming apparatus; a switching unit configured to switch a state of the unit between a first state and a second state, wherein the first state is a state in which removal of the unit from the image forming apparatus is inhibited and the second state is a state in which removal of the unit from the image forming apparatus is allowed, and a control unit configured to control the switching unit, wherein in a case where the control unit determines that the door is open based on a result of detection by the open/close detection unit while the unit is in the first state, the control unit controls the switching unit to switch a state of the unit to the second state.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

[Image Forming Apparatus]

Figure 1:
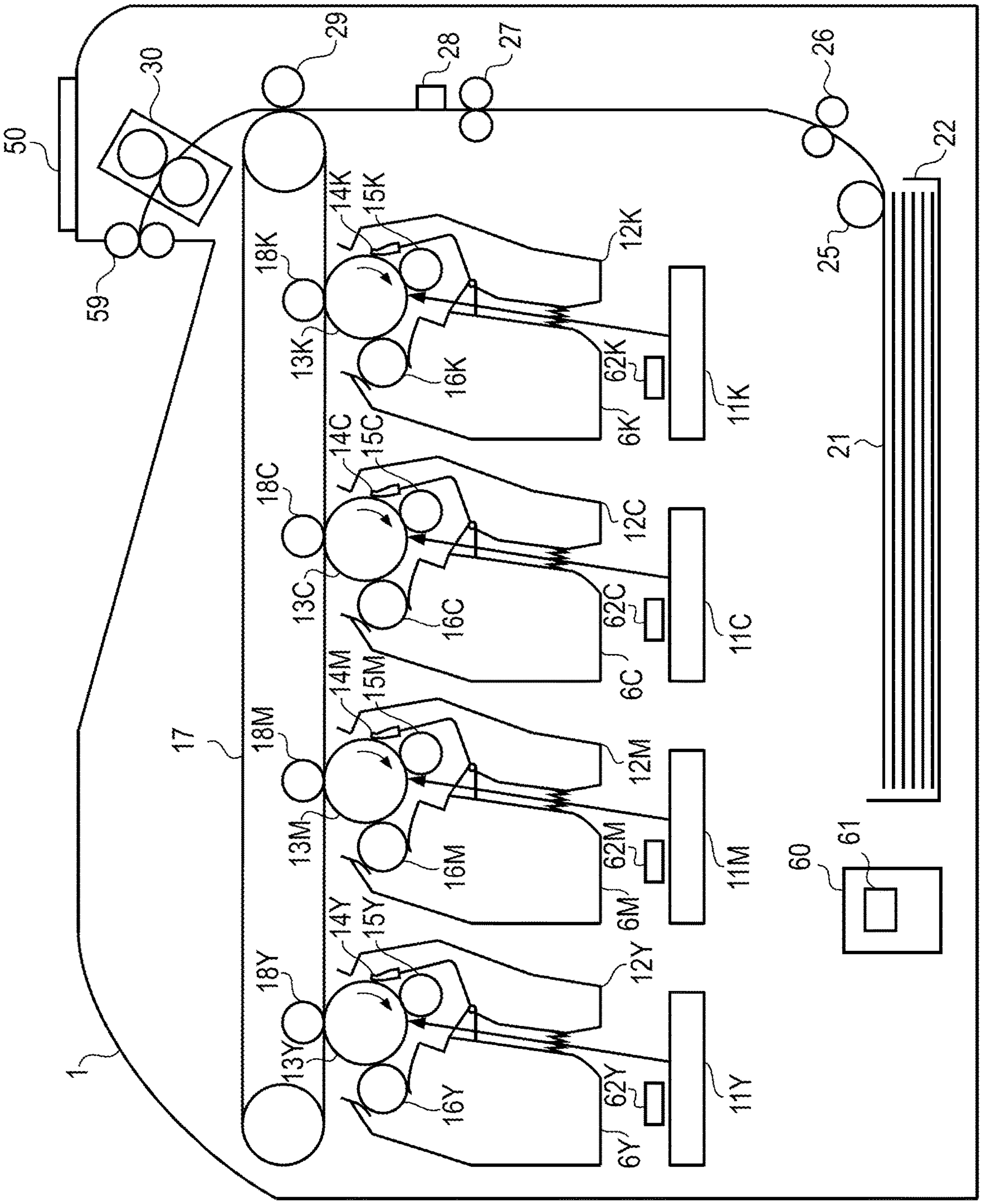
FIG. 1 is a configuration diagram generally illustrating a color image forming apparatus in first to third embodiments.

FIG. 1 is a configuration diagram generally illustrating a tandem-type color image forming apparatus in a first embodiment. The tandem-type color image forming apparatus is configured to be able to output full-color images by layering four colors of toner: yellow (Y), magenta (M), cyan (C) and black (K). The indices Y, M, C and K of reference signs represent the respective colors. It is to be noted that the indices Y, M, C and K of the reference signs will be omitted except where members of a particular color are described. A laser scanner 11 and a cartridge 12 are provided for image forming of each color. The cartridge 12 includes a photosensitive drum 13 that rotates in the direction of an arrow in FIG. 1, as well as a drum cleaner 14, a charge roller 15, and a development roller 16 that are provided to contact the photosensitive drum 13, and a toner container 6 containing toner to be supplied to the development roller 16. An intermediate transfer belt 17 is provided in contact with the photosensitive drums 13 of the four colors, and primary transfer rollers 18 are provided to face the respective photosensitive drums 13 with the intermediate transfer belt 17 in between. Sheets 21, which are recording materials, are held in a cassette 22. Provided on the conveyance path of the sheets 21 are a sheet feed roller 25, conveyance rollers 26, and registration rollers 27. A registration sensor 28 is provided near the registration rollers 27 on the downstream side in the conveyance direction of the sheets 21. A secondary transfer roller 29 is provided to contact the intermediate transfer belt 17, and a fixing device 30 and ejection rollers 59 are provided downstream of the secondary transfer roller 29 in the conveyance direction.

An electrophotography process will now be described. The surface of the photosensitive drum 13 is uniformly charged by the charge roller 15 at a dark place in each cartridge 12. The surface of the photosensitive drum 13 is then irradiated by the laser scanner 11 with laser light modulated according to image data, so that the charges in the portions irradiated with the laser light are removed. An electrostatic latent image is thus formed on the surface of the photosensitive drum 13. The development roller 16 applies charged toner to the electrostatic latent image to form a toner image of the corresponding color on the surface of the photosensitive drum 13. The toner image formed on the surface of each photosensitive drum 13 is sequentially transferred in layers by the primary transfer roller 18 onto the intermediate transfer belt 17.

Meanwhile, a sheet 21 in the cassette 22 is fed by the sheet feed roller 25 and conveyed to the registration rollers 27 via the conveyance rollers 26. The toner images on the intermediate transfer belt 17 are then transferred by the secondary transfer roller 29 onto the sheet 21 conveyed via the registration rollers 27. Finally, the unfixed toner images on the sheet 21 are fixed by the fixing device 30, and the ejection rollers 59 eject the sheet 21 out of the image forming apparatus.

A body 1 has a control substrate 60, toner remaining amount detection units 62 serving as remaining amount detection units, and a display unit 50. The control substrate 60 includes a control unit 61, which is a control unit for controlling the body 1. The control unit 61 is responsible for the overall control of operation of the body 1, such as control of driving sources for conveying the sheets 21 and control related to image forming. The control unit 61 has a memory unit (not shown), in which machine type information is stored in advance, for example before shipment from the factory. The toner remaining amount detection units 62Y, 62M, 62C and 62K are units for detecting the amounts of toner remaining in the toner containers 6Y, 6M, 6C and 6K. The display unit 50 is a display device for notifying a user of information from the body 1.

[Cartridge Insertion Configuration]

Figure 2:
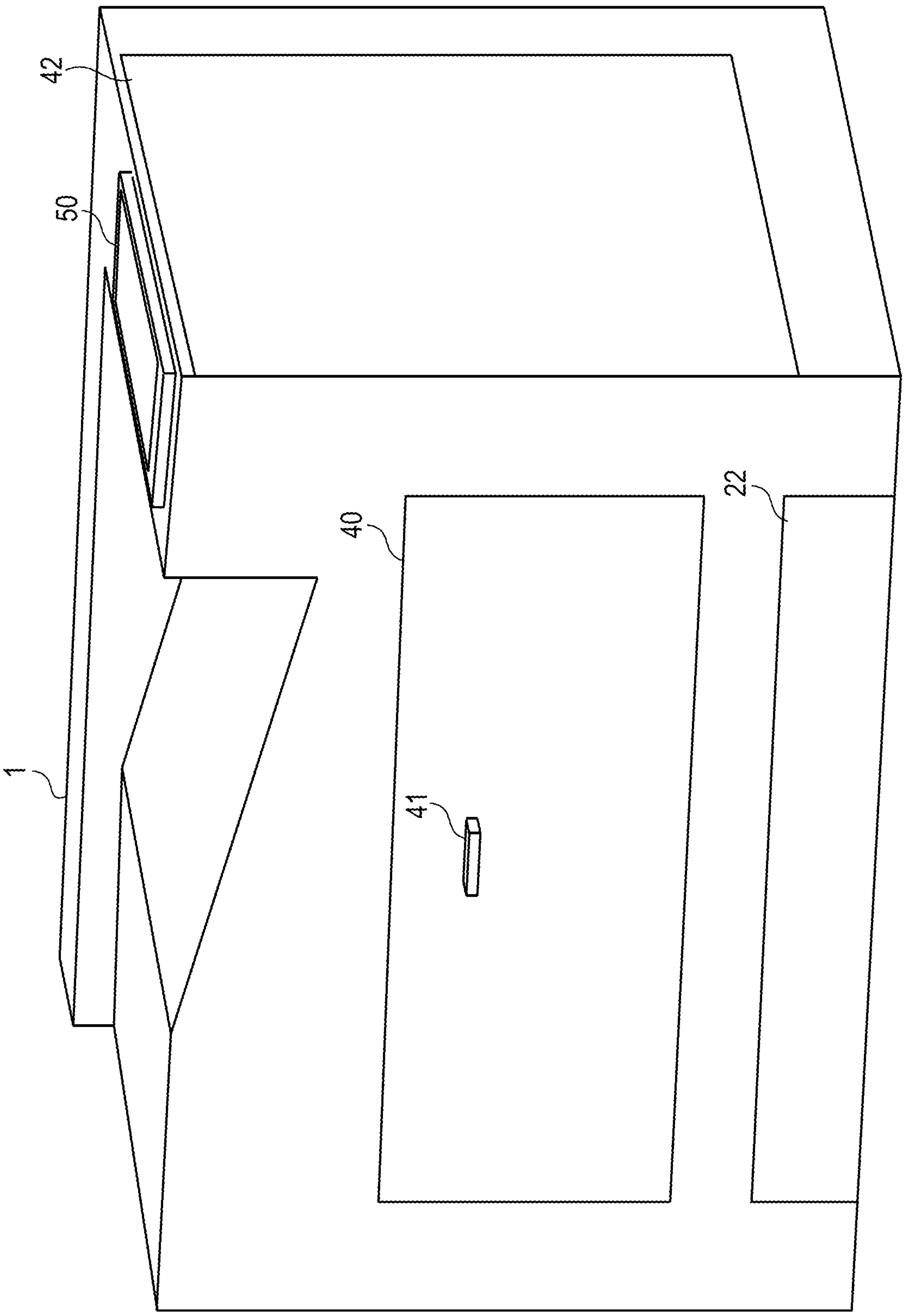
FIG. 2 is a perspective view illustrating a door configuration in the first embodiment.
Figure 3A:
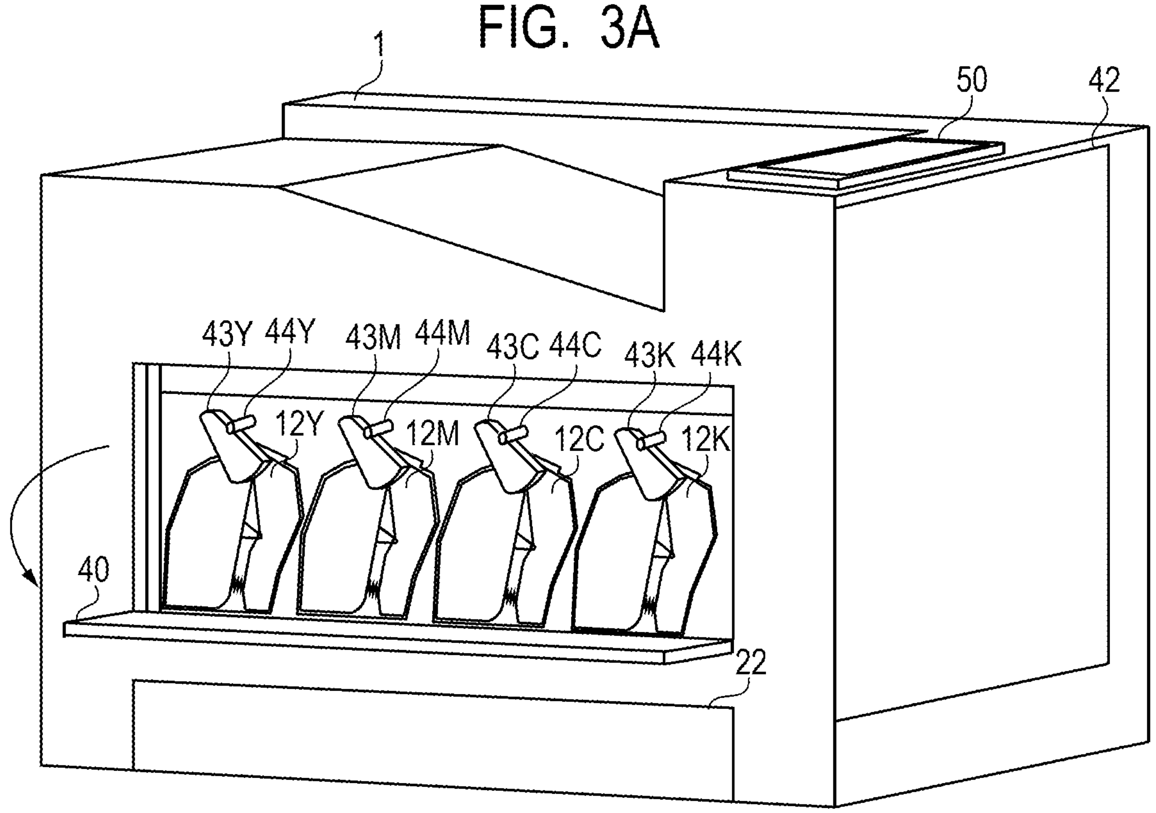
FIGS. 3A and 3B are perspective views when a door is open in the first embodiment.
Figure 3B:
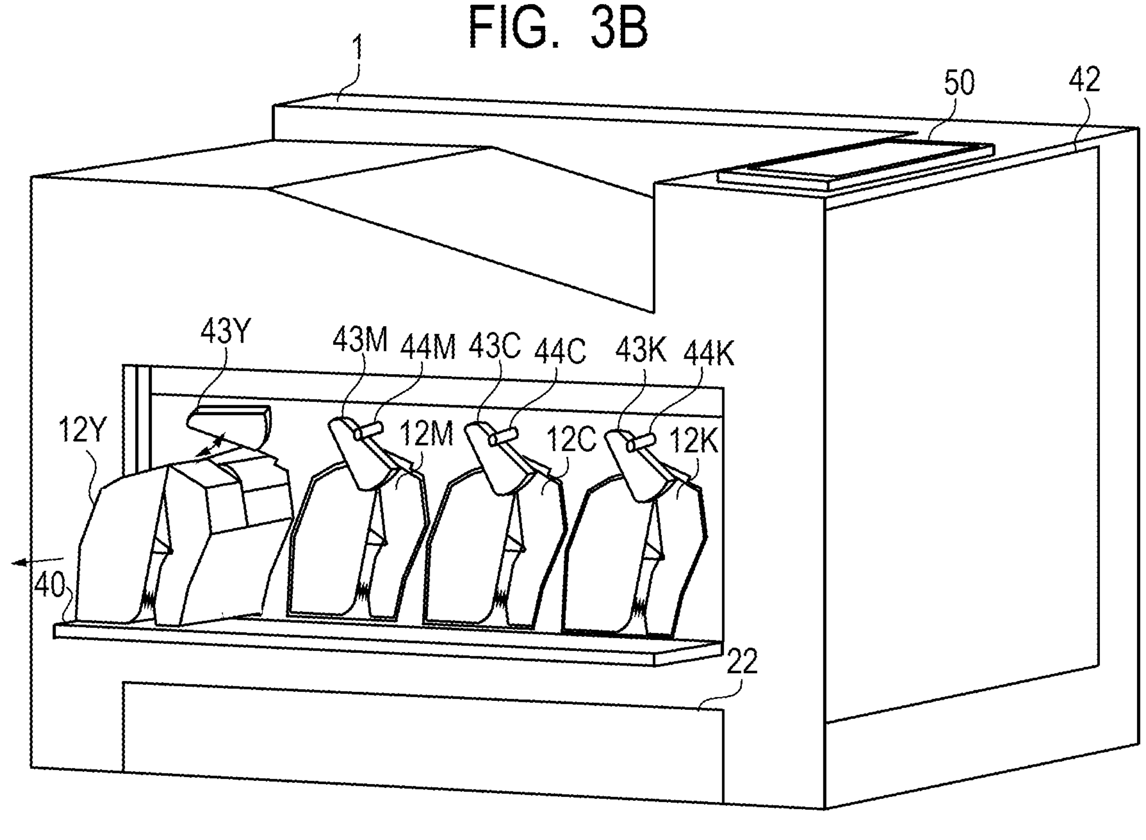

The insertion configuration of the cartridges 12 in the first embodiment will now be described with reference to FIGS. 2, 3A and 3B. FIGS. 2, 3A and 3B are schematic perspective views of a printer, which is the image forming apparatus in which the cartridges 12 can be inserted into and removed from the body 1. Each cartridge 12 is an example of a unit removable from and insertable into the body 1 of the image forming apparatus, such that a new unit is inserted into the body 1 and continually used, and eventually replaced at the time when replacement is needed (hereinafter referred to as the life end). Replacement of a unit may be needed when predetermined image quality cannot be maintained any more in image forming with that unit. FIG. 2 shows a state in which a door 40 as a first door is closed; the first door 40 covers and uncovers an opening provided on the body 1 for replacement of the cartridges 12. Here, the door 40 is a door for accessing the cartridges 12 for removing the cartridges 12 from inside the body 1. An operation member 41 is a member operated by the user to open and close the door 40. A door 42 as a second door is a door for accessing the sheet conveyance path, such as for performing jam handling for eliminating stagnating sheets 21 at the occurrence of a paper jam during conveyance of the sheets 21.

FIG. 3A is a diagram when the door 40 is open. From the state of FIG. 2, operating the operation member 41 to move the door 40 in the direction indicated by an arrow in FIG. 3A uncovers the section of the door 40. Here, locking members 43Y, 43M, 43C and 43K are members for locking the removal of the respective cartridges 12Y, 12M, 12C and 12K. Locking pins 44Y, 44M, 44C and 44K, which are switching units, are pins for restricting the positions of the respective locking members 43Y, 43M, 43C and 43K, which are also switching units. Each locking pin 44 can be switched between the protruding state and the retracting state by a solenoid (not shown). In the protruding state, the locking pin 44 protrudes frontward from the image forming apparatus beyond the locking member 43. In the retracting state, the locking pin 44 is behind the locking member 43. Here, when the locking pin 44 is in the protruding state, the locking member 43 is fixed in the position of a first state (hereinafter referred to as the locked state) in which the cartridge 12 is locked so as not to be removed (removal inhibited). This prevents the user from removing the cartridge 12.

FIG. 3B is a diagram showing the locking pin 44Y in the retracting state. In this state, the locking member 43Y can be pivotably moved to a position (hereinafter referred to as a removable position) where the locking member 43Y allows the cartridge 12 to be removed (removable). In FIG. 3B, the yellow cartridge 12Y is in a second state (hereinafter referred to as the unlocked state) in which the cartridge 12Y is unlocked. The user can remove the cartridge 12Y from the body 1 by pulling out the cartridge 12Y in the direction indicated by a dark arrow in FIG. 3B. As shown in FIG. 3A, in this configuration, only opening the door 40 does not allow the cartridge 12 to be removed from the body 1. As shown in FIG. 3B, when the door 40 is open and the locking pin 44 is in the retracting state, the cartridge 12 can be removed in the frontward direction (the arrow direction) from the image forming apparatus.

The locking pin 44Y is controlled by the control unit 61 to be described below. The control unit 61 is configured to switch between a state in which the removal of the cartridge 12 is allowed (hereinafter referred to as removal allowed) and a state in which the removal is inhibited (hereinafter referred to as removal inhibited).

[Control Configuration]

Figure 4:
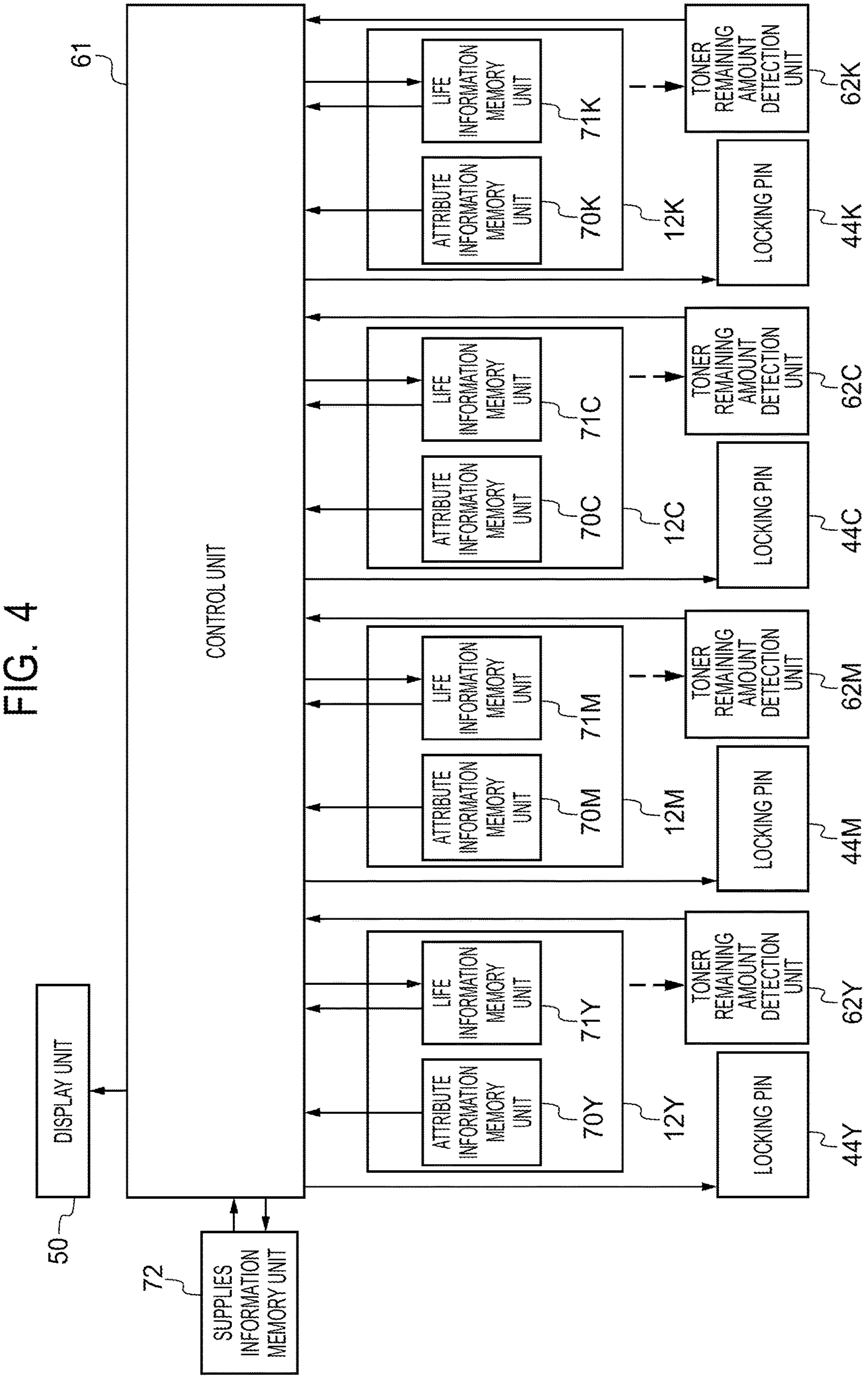
FIG. 4 is a block diagram illustrating a control configuration in the first embodiment.

FIG. 4 is a block diagram of a control configuration. The control unit 61 includes components such as a CPU and is responsible for management of information about the cartridges 12, management of the lives of the cartridges 12, and control of switching between locking and unlocking. Each cartridge 12 has an attribute information memory unit 70 (non-transitory unit memory) that stores supplies attribute information, and a life information memory unit 71 (non-transitory unit memory) that stores supplies life information. The supplies attribute information is information such as the serial number uniquely assigned to the cartridge 12, for example. The supplies life information is information indicating the life of the cartridge 12, for example. The attribute information memory unit 70 and the life information memory unit 71 are connected to the control unit 61 upon insertion of the cartridge 12 into the body 1.

A supplies information memory unit 72, which is a first memory unit, is a nonvolatile memory unit (non-transitory apparatus memory) residing in the body 1 for storing the content of the attribute information memory unit 70 and the life information memory unit 71. The supplies information memory unit 72 is used to detect the replacement of the cartridge 12. The display unit 50 is used to notify the user of the life end of the cartridge 12 and an abnormality of the locking mechanism for the cartridge 12.

[Supplies Attribute Information and Supplies Life Information]

Table 1 illustrates the content stored in the attribute information memory unit 70Y, which is a second memory unit. Table 2 illustrates the content stored in the life information memory unit 71Y, which is also a second memory unit. In each of the Tables 1 and 2, the first column contains items and the second column contains values for the respective items. The attribute information memory unit 70Y stores the serial number (hereinafter denoted as the serial No.) unique to the cartridge 12, machine type information about an image forming apparatus in which the cartridge 12 is to be used, and cartridge color information indicating the color of the cartridge 12. This stored content is never updated by the control unit 61. For example, the attribute information memory unit 70Y for yellow stores the serial No. "12345," the type information "LBPXXXX," and the cartridge color information "Y."

TABLE 1

| Item | Value |
|---|---|
| Serial No. | 12345 |
| Machine type | LBPXXXX |
| Cartridge color information | Y |

The life information memory unit 71Y stores the life end rotation time for determining the life end of the photosensitive drum 13Y, and the total rotation time of the photosensitive drum 13Y. The total rotation time of the photosensitive drum 13Y is accumulated as the photosensitive drum 13 rotates during the operation of the image forming apparatus, and updated accordingly. The control unit 61 uses the values of the life end rotation time and the total rotation time to calculate the remaining life of the photosensitive drum 13Y in terms of rotation time. For example, Table 2 stores 10000 sec (seconds) and 6000 sec for the life end rotation time and the total rotation time of the photosensitive drum 13Y, respectively. The amount of usage in % is therefore 6000/10000×100=60%, so that the life left for the photosensitive drum 13Y (hereinafter referred to as the remaining life) is 40% (=100%−60%).

TABLE 2

| Item | Value |
|---|---|
| End-of-life rotation time of photosensitive drum 13Y | 10000 sec |
| Total rotation time of photosensitive drum 13Y | 6000 sec |
| End-of-life rotation distance of photosensitive drum 13Y | 5000 m |
| Total rotation distance of photosensitive drum 13Y | 3500 m |
| Remaining amount in toner container 6Y | 25% |
| Remaining amount for unlocking cartridge 12Y | 5% |

The life information memory unit 71Y also stores the life end rotation distance for determining the life end of the photosensitive drum 13Y, and the total rotation distance of the photosensitive drum 13Y. The total rotation distance of the photosensitive drum 13Y is accumulated as the photosensitive drum 13 rotates during the operation of the image forming apparatus, and updated accordingly. The control unit 61 uses the values of the life end rotation distance and the total rotation distance to calculate the remaining life of the photosensitive drum 13Y in terms of rotation distance. For example, Table 2 stores 5000 m (meters) and 3500 m for the life end rotation distance and the total rotation distance of the photosensitive drum 13Y, respectively. The amount of usage in % is therefore 3500/5000×100=70%, so that the remaining life of the photosensitive drum 13Y is 30% (=100%−70%).

The remaining amount in the toner container 6Y in Table 2 indicates the amount of toner remaining in the toner container 6Y detected by the toner remaining amount detection unit 62Y, and the value is stored as detected. In a typical technique, the amount of remaining toner is calculated by accumulating the number of pixels of images formed by the relevant one of the laser scanners 11Y, 11M, 11C and 11K. Other techniques may also be used to determine the amount of remaining toner. Among the three remaining amounts (remaining lives) of the cartridge 12Y based on Table 2 (i.e., the remaining life determined with the total rotation time, the remaining life determined with the total rotation distance, and the remaining amount of toner), the amount with the smallest value is regarded as the remaining amount of the cartridge 12Y. This remaining life with the smallest value among the three remaining lives will be hereinafter referred to as the shortest life information.

In the example of Table 2, the remaining life is determined as 40% from the total rotation time, 30% from the total rotation distance, and 25% from the amount of remaining toner. Accordingly, the control unit 61 regards the remaining life (the shortest life information) of the cartridge 12Y as 25%. In this manner, the control unit 61 obtains the shortest life information from the remaining lives determined in the different ways based on the values stored in the life information memory unit 71 of the cartridge 12, and regards the obtained shortest life information as the remaining life of the cartridge 12. In the first embodiment, the remaining life of the cartridge 12 is thus determined based on the multiple pieces of information, specifically the total rotation time, the total rotation distance, and the amount of remaining toner. Alternatively, the remaining life of the cartridge 12 may be determined based on one piece of information, specifically any one of the total rotation time, the total rotation distance, and the amount of remaining toner. Other information correlated with the remaining life of the cartridge 12 may also be used.

The remaining amount for unlocking the cartridge 12Y (hereinafter referred to as the remaining amount for unlocking) in Table 2 is a set value for the remaining amount for releasing the locking mechanism, such that the locking mechanism is released if the remaining amount of the cartridge 12Y falls to or less than that value (hereinafter referred to as a set value for the remaining amount). If the remaining life of the cartridge 12Y falls to or less than the remaining amount for unlocking, the control unit 61 releases the locking mechanism. In the example of Table 2, the control unit 61 releases the locking mechanism if the shortest life information falls to or less than 5%. This manner of unlocking by the control unit 61 (i.e., determining the time to replace the cartridge 12 based on the shortest life information and the remaining amount for unlocking and then releasing the locking mechanism) will hereinafter be referred to as normal release of the locking mechanism.

[Supplies Information Memory Unit]

Table 3 illustrates information stored in the supplies information memory unit 72. The supplies information memory unit 72 stores information selected from the information stored in the memory units (70, 71) of the cartridge 12 of each color. Here, the serial No. for comparison, the lock state of the locking mechanism, and the shortest life information are stored.

TABLE 3

| | Item | Value |
|---|---|---|
| Y | Serial No. | 12345 |
| | Lock state | Locked |
| | Shortest life information | 25% |
| M | Serial No. | 67890 |
| | Lock state | Locked |
| | Shortest life information | 25% |
| C | Serial No. | 98765 |
| | Lock state | Locked |
| | Shortest life information | 25% |
| K | Serial No. | 55555 |
| | Lock state | Locked |
| | Shortest life information | 25% |

In Table 3, the first column contains the colors, the second column contains items for each color, and the third column contains values for the respective items. For example, for yellow (Y), the serial No. has information, for example "12345," read from the attribute information memory unit 70Y. The lock state has information about the control of the locking mechanism performed by the control unit 61 ("locked" or "unlocked"), which is here set to "locked" for example. Further, the shortest life information has information, for example "25%," read from the life information memory unit 71Y.

[Control to Set and Release Locking Mechanism during Image Forming]

Figure 5:
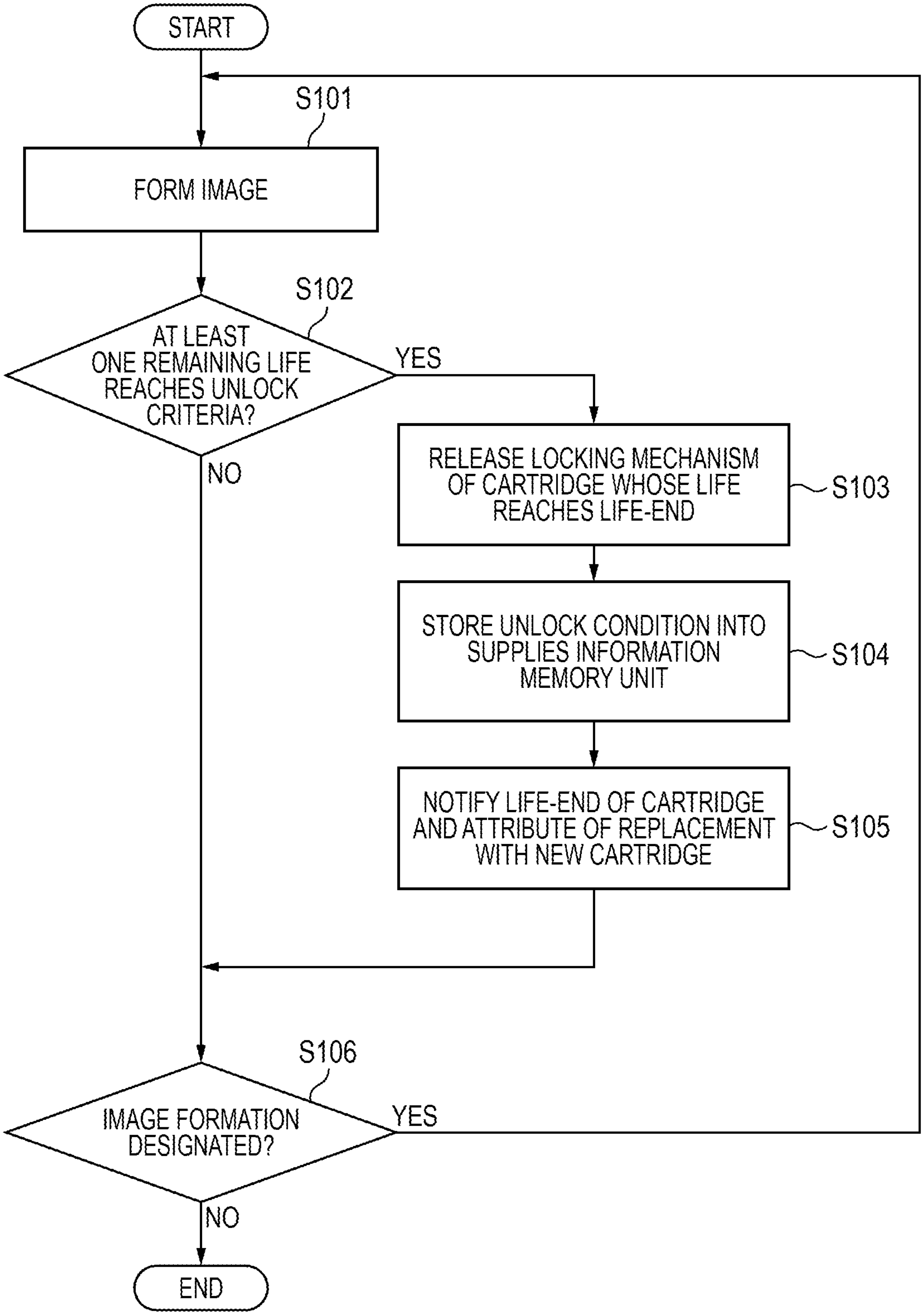
FIG. 5 is a flowchart illustrating an unlocking process in the first embodiment.

The method of handling the locking mechanism by the control unit 61 will now be described with reference to the flowcharts in FIGS. 5 and 6. The flowchart in FIG. 5 illustrates the process flow of the normal release of the locking mechanism, in which the locking mechanism is released if the remaining life of at least one cartridge 12 falls to or less than the remaining amount for unlocking (falls to or less than a predetermined value) during image forming.

Upon receiving an image forming designation, the control unit 61 starts the process beginning in step (hereinafter denoted as S) 101. In S101, the control unit 61 forms an image. In S102, during or after the image forming, the control unit 61 refers to the information in Table 2 stored in each life information memory unit 71 to determine whether or not the remaining life of at least one cartridge 12 reaches the unlocking criterion for releasing the locking mechanism. Here, if the remaining life of a cartridge 12 reaches the criterion for releasing the locking mechanism, it means that the cartridge 12 reaches the life end. If the control unit 61 determines in S102 that the remaining life reaches the criterion, the control unit 61 advances the process to S103, if the control unit 61 determines in S102 that the remaining life does not reach the criterion, the control unit 61 advances the process to S106. For example, for the yellow cartridge 12Y, the control unit 61 determines that the remaining life is 25% from the shortest life information in Table 3 and that the criterion is 5% from the remaining amount for unlocking in Table 2. The control unit 61 compares these percentages and determines that the yellow cartridge 12Y does not reach the criterion. In S103, for the cartridge 12 determined as having the remaining life reaching the criterion for releasing the locking mechanism, the control unit 61 releases the locking mechanism by causing the corresponding locking pin 44 to retract. For example, if the remaining life of the yellow cartridge 12Y is equal to or less than the remaining amount for unlocking 5%, the control unit 61 causes the locking pin 44Y for yellow to retract.

In S104, for the lock state of the cartridge 12 determined as reaching the life end, the control unit 61 stores information indicating the unlocked state (for example, "unlocked") in Table 3 in the supplies information memory unit 72. In S105, the control unit 61 causes the display unit 50 to display the following information. That is, the control unit 61 provides display of a notification of the life end of the cartridge 12 and a prompt (such as a replacement attention) to replace the dead cartridge 12 with a new one (hereinafter referred to as a new cartridge), and advances the process to S106. In S106, the control unit 61 determines whether or not a further image forming designation is received. If the control unit 61 determines that a further image forming designation is received, the control unit 61 returns the process to S101, if the control unit 61 determines that a further image forming designation is not received, the control unit 61 terminates the process.

Thus, the cartridge 12 is unlocked only if the remaining life of the cartridge 12 falls to or less than a predetermined amount. This prevents incurring unnecessary cost by erroneously replacing the still alive cartridge 12 with another cartridge, for example a new cartridge.

[Control to Set and Release Locking Mechanism, e.g., upon Power-On]

Figure 6:
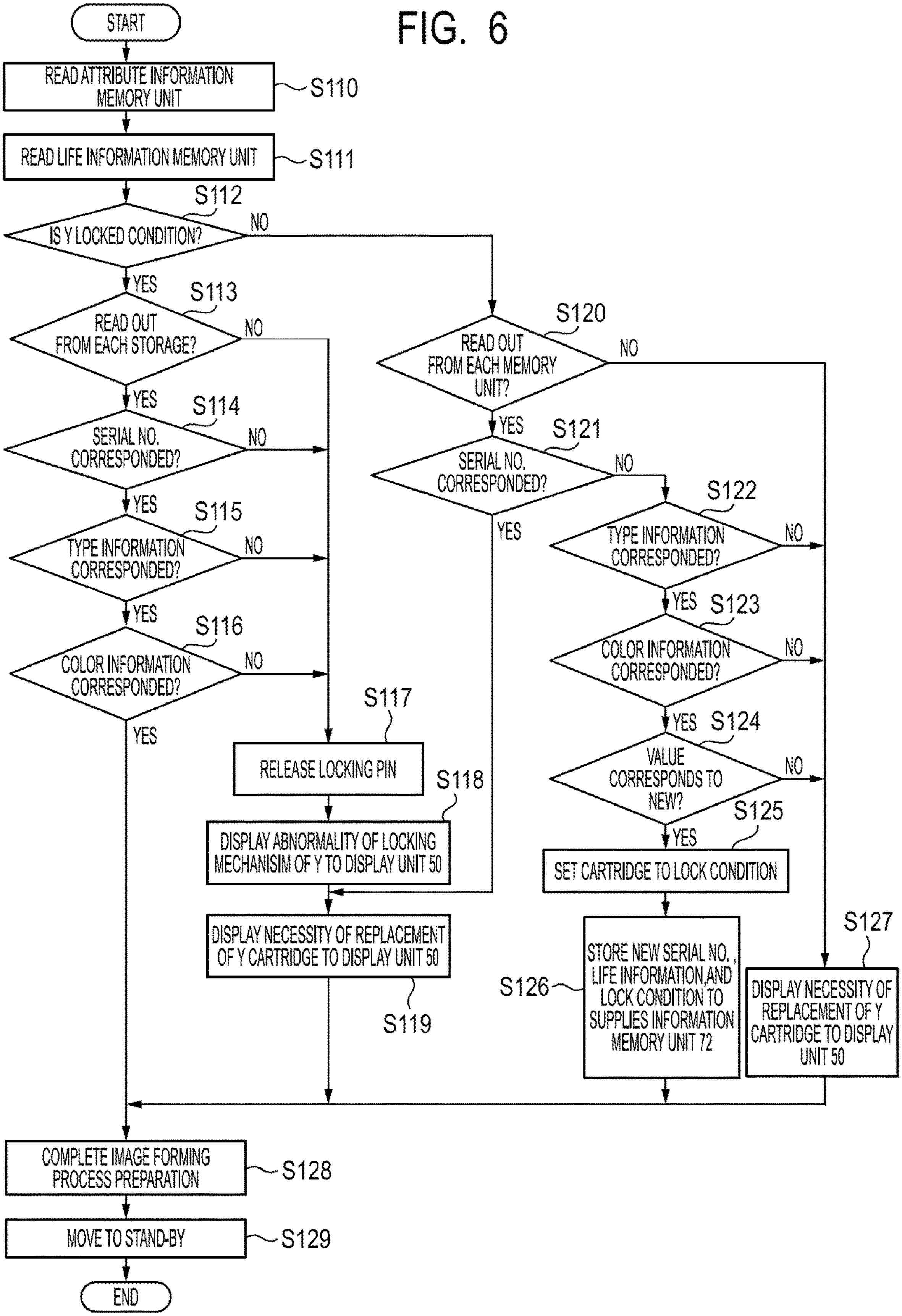
FIG. 6 is a flowchart illustrating an unlocking process in the first embodiment.

The flowchart in FIG. 6 illustrates operations for locking or unlocking the cartridge 12Y when the power is turned on (hereinafter referred to as power-on) or when the door 40 is in the closed state (hereinafter referred to as door-closed). While the yellow cartridge 12Y is described in the flowchart in FIG. 6, the same process is also performed for the other cartridges 12M, 12C and 12K.

In S110, the control unit 61 reads the supplies attribute information (Table 1) from the attribute information memory unit 70Y of the cartridge 12Y. In S111, the control unit 61 reads the supplies life information (Table 2) from the life information memory unit 71Y of the cartridge 12Y. In S112, the control unit 61 determines whether or not the lock state of the yellow cartridge 12Y stored before power-off or door-closed in the supplies information memory unit 72 (Table 3) indicates the locked state. If the control unit 61 determines in S112 that the yellow cartridge 12Y is in the locked state, the control unit 61 advances the process to S113. If the control unit 61 determines that the yellow cartridge 12Y is not in the locked state (i.e., is in the unlocked state), the control unit 61 advances the process to S120.

S113 and the following steps are the process after the determination that the yellow cartridge 12Y is in the locked state, and it is determined whether the locked state can be maintained. In S113, the control unit 61 determines whether or not the information was successfully read from the attribute information memory unit 70Y and the life information memory unit 71Y (each memory unit). If the control unit 61 determines in S113 that the information was able to be read from these memory units, the control unit 61 advances the process to S114, while if the control unit 61 determines in S113 that the information was not able to be read from these memory units, the control unit 61 advances the process to S117. In S114, the control unit 61 determines whether or not the serial No. read from the attribute information memory unit 70Y is identical with (matches) the serial No. of the cartridge 12Y stored in the supplies information memory unit 72. If the control unit 61 determines in S114 that the two serial Nos. match each other, the control unit 61 advances the process to S115, while if the control unit 61 determines in S114 that the two serial Nos. do not match each other, the control unit 61 advances the process to S117.

In S115, the control unit 61 determines whether or not the machine type information stored in the attribute information memory unit 70Y matches the machine type information stored in advance in the memory unit (not shown) of the control unit 61. If the control unit 61 determines in S115 that the machine type information matches each other, the control unit 61 advances the process to S116, if the control unit 61 determines in S115 that the machine type information does not match each other, the control unit 61 advances the process to S117. In S116, the control unit 61 determines whether or not the cartridge color information stored in the attribute information memory unit 70Y indicates yellow (whether the color information matches the color of interest). If the control unit 61 determines in S116 that the color information matches the color of interest, the control unit 61 advances the process to S128 as normal start-up operation without performing lock processing. If the control unit 61 determines in S116 that the color information does not match the color of interest (for example, indicates a color other than yellow), the control unit 61 advances the process to S117.

S117 and the following steps are the process in the case where it is determined that the cartridge 12 has been replaced although in the locked state. In S117, the control unit 61 releases the lock. For example, the control unit 61 releases the lock by causing the locking pin 44Y for yellow to retract. At this time, the control unit 61 maintains the serial No. and the lock state in the supplies information memory unit 72 as previously stored. In S118, the control unit 61 causes the display unit 50 to display an abnormality of the locking mechanism for yellow. In S119, the control unit 61 causes the display unit 50 to display the necessity to replace the cartridge 12 for yellow (the Y cartridge) and advances the process to S128.

S120 and the following steps are the process in the case where the cartridge is in the unlocked state, describing the conditions to lock the unlocked cartridge. In S120, the control unit 61 determines whether or not the information was successfully read from the attribute information memory unit 70Y and the life information memory unit 71Y. If the control unit 61 determines in S120 that the information was able to be read from these memory units, the control unit 61 advances the process to S121, while if the control unit 61 determines in S120 that the information was not able to be read from these memory units, the control unit 61 advances the process to S127. In S121, the control unit 61 determines whether or not the serial No. read from the attribute information memory unit 70Y matches the serial No. of yellow stored in the supplies information memory unit 72. If the control unit 61 determines in S121 that the serial Nos. match each other, the control unit 61 advances the process to S119, while if the control unit 61 determines in S121 that the serial Nos. do not match each other, the control unit 61 advances the process to S122. Advancement of the process from S121 to S119 means that, although the yellow cartridge 12Y has reached the life end and the unlocked state has been stored in the supplies information memory unit 72 in the processing of S104 in FIG. 5, the cartridge 12Y has not yet been replaced with a new cartridge. Advancement of the process from S121 to S122 means that the yellow cartridge 12Y has reached the life end and the unlocked state has been stored in the supplies information memory unit 72 in the processing of S104 in FIG. 5, and the cartridge 12Y has been replaced with another cartridge. The phrase "another cartridge" is used here because it may be a new yellow cartridge compatible with the body 1 or may be some other cartridge.

S122 and the following steps are the process in the case where the cartridge 12 has been replaced in the unlocked state. In S122, the control unit 61 determines whether or not the machine type information stored in the attribute information memory unit 70Y of the inserted cartridge 12 matches the machine type information stored in the memory unit (not shown) of the control unit 61. If the control unit 61 determines in S122 that the machine type information matches each other, the control unit 61 advances the process to S123, while if the control unit 61 determines in S122 that the machine type information does not match each other, the control unit 61 advances the process to S127. In S123, the control unit 61 determines whether or not the cartridge color information stored in the attribute information memory unit 70Y matches the color of current interest, i.e., yellow. If the control unit 61 determines in S123 that the color information matches the color of interest, the control unit 61 advances the process to S124, if the control unit 61 determines in S123 that the color information does not match the color of interest, the control unit 61 advances the process to S127.

In S124, the control unit 61 determines whether or not the cartridge 12Y is a new cartridge based on the life information memory unit 71Y. Here, the control unit 61 determines that the cartridge 12Y is a new cartridge if the total rotation time and the total rotation distance of the photosensitive drum 13Y in Table 2 in the life information memory unit 71 are equal to or less than predetermined values, respectively. If the control unit 61 determines in S124 that the cartridge 12Y is a new cartridge, the control unit 61 advances the process to S125, if the control unit 61 determines in S124 that the cartridge 12Y is not a new cartridge, the control unit 61 advances the process to S127. In S125, the control unit 61 causes the locking pin 44Y to protrude to lock the cartridge 12Y. In S126, the control unit 61 overwrites the serial No. of yellow in the supplies information memory unit 72 with the value of the new serial No. read from the attribute information memory unit 70Y of the new cartridge 12Y. The control unit 61 also sets the shortest life information about Y to a value indicating a new cartridge (for example, 100%) and sets the lock state of Y to the locked state in the supplies information memory unit 72, and advances the process to S128.

In S127, as processing in the case where a new cartridge is not inserted although the cartridge is in the unlocked state, the control unit 61 causes the display unit 50 to display the necessity to replace the cartridge 12Y (the Y cartridge) and advances the process to S128. The processing in S127 is performed if an incompatible cartridge is inserted in the body 1 as indicated by the mismatch of the machine type information, or if a cartridge of a different color is inserted in the body 1, or if a cartridge that is not new is inserted in the body 1. The processing in S127 is also performed if the information was not successfully read from each memory unit. In S128, the control unit 61 is prepared for an image forming process and advances to S129, where the control unit 61 moves to the stand-by state capable of image forming and terminates the process.

Thus, if the consumable cartridge 12 that is still alive and in the locked state is replaced in a case such as a locking mechanism malfunction, the lock is controlled as follows. Untimely locking is prevented, and the user is provided with a notification of the malfunction of the locking mechanism and a prompt to reinsert the original cartridge. This is for keeping the lock released to allow the user to reinsert and use the still alive cartridge 12 removed prematurely, because the user would not be able to easily replace the cartridge 12 in the locked state. While the cartridges 12 have been described as an example of replaceable units (supplies) in the first embodiment, the replaceable units (supplies) are not limited to cartridges 12. This also applies to the following embodiments.

While the cartridge locking mechanism in the color image forming apparatus with multiple cartridges has been described in the first embodiment, similar control is also possible for a monochrome image forming apparatus with only one cartridge. Thus, according to the first embodiment, usability related to the locking mechanism for the replaceable unit(s) can be improved.

In a second embodiment, the apparatus has doors for individually accessing the respective cartridges 12Y, 12M, 12C and 12K. Each door includes a door locking mechanism that restricts the removal of the corresponding cartridge 12, and further includes a sensor that detects the opening/closing of the door. The same components as described in the first embodiment will be given the same reference numerals and not be described.

[Configurations of Cartridges and Doors]

Figure 7:
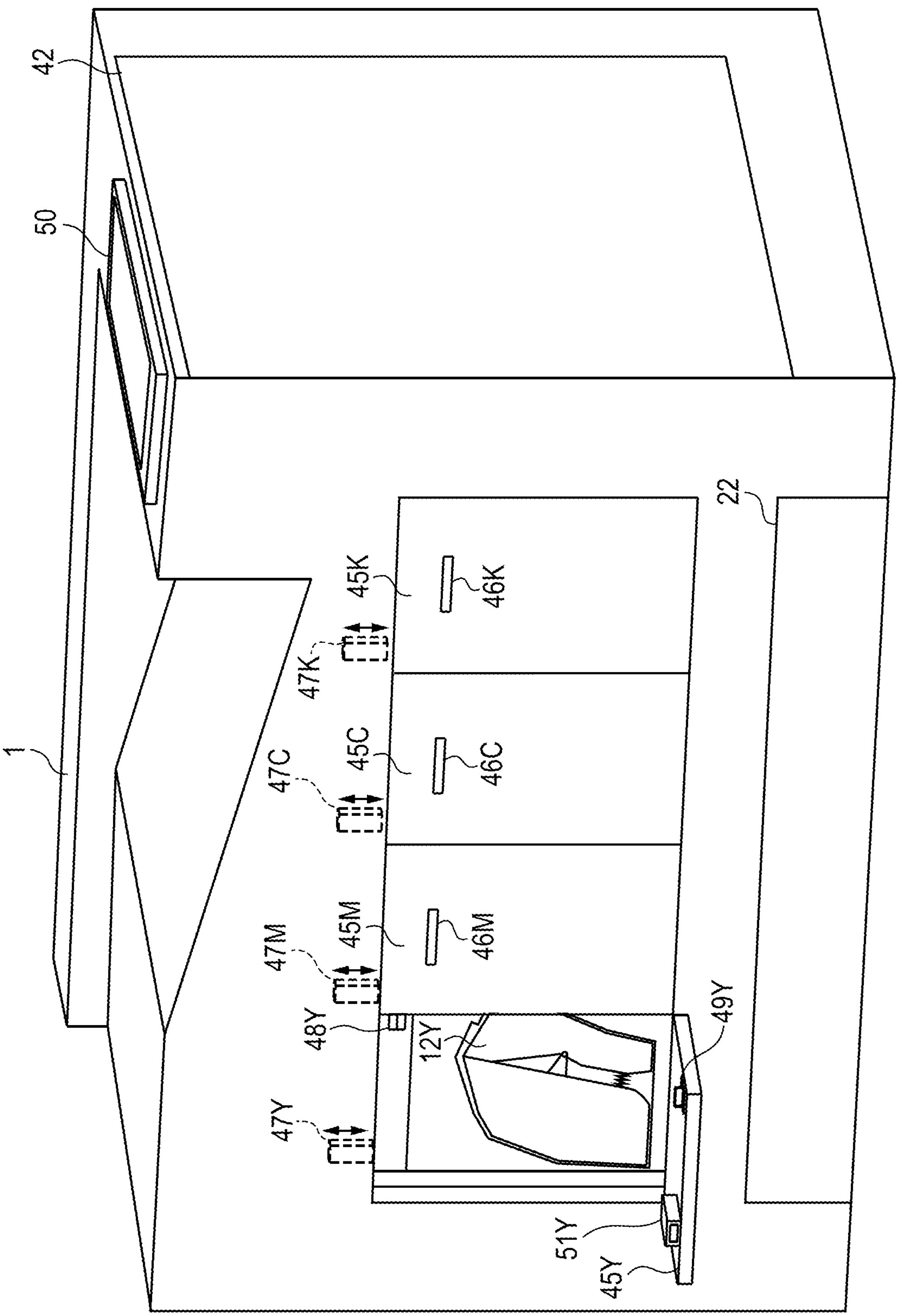
FIG. 7 is a perspective view illustrating a door lock configuration when a door is open in the second embodiment.

The insertion configuration of the cartridges 12 and the door configuration in the second embodiment will be described with reference to FIGS. 7, 8A and 8B. FIG. 7 is a schematic perspective view of a printer, which is the image forming apparatus in which the cartridges 12 can be inserted into and removed from the body 1 of the image forming apparatus. FIG. 7 shows doors 45Y, 45M, 45C and 45K provided for the respective cartridges 12, among which the door 45Y is open and the doors 45M, 45C and 45K are closed. Locking pins 47, which are switching units, restrict the movement of the respective doors 45 toward the open state. Locking members 51, which are also switching units, are paired with the respective locking pins 47 to hold the doors 45 closed.

Figure 8A:
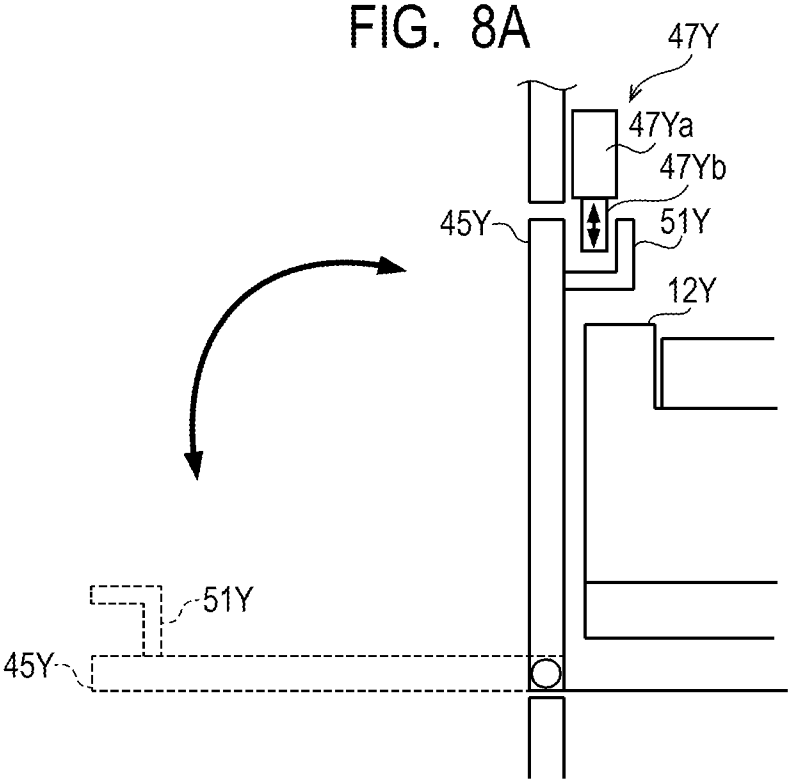
FIG. 8A is a cross-sectional view illustrating a door lock configuration in the second embodiment.

As illustrated in FIG. 8A, when the locking pin 47Y is in the protruding state, the locking pin 47Y engages with the locking member 51Y to hold the door 45Y closed. The door 45Y held closed inhibits the user from removing the cartridge 12Y. The locking pins 47 are controlled by a control unit 81 (to be described later) to either allow the respective doors 45 to be open (hereinafter referred to as "allowed to be open") or hold the respective doors 45 closed (hereinafter referred to as "held closed").

An open/close sensor 48Y, which is a second detection unit, detects the open/closed state of the door 45Y. A member 49Y is a member for the open/close sensor 48Y to detect the open/closed state of the door 45Y. Open/close sensors 48M, 48C and 48K, which are second detection units, and members 49M, 49C and 49K are not shown because the doors 45M, 45C and 45K are closed. Operation members 46M, 46C and 46K are members for operating the respective doors 45M, 45C and 45K. An operation member 46Y is not shown because the door 45Y is open.

FIG. 8A is a cross-sectional view at the position of the locking pin 47Y, illustrating the cartridge 12Y and the door locking configuration of the door 45Y. The locking pin 47Y includes a locking pin body 47Ya and a member 47Yb that is retracted inside or protrudes outside the locking pin body 47Ya. With the door 45Y closed, if the member 47Yb of the locking pin 47Y is lowered to protrude, the member 47Yb engages with the locking member 51Y. The engagement of the member 47Yb of the locking pin 47Y with the locking member 51Y holds the door 45Y closed (held closed). In contrast, if the member 47Yb of the locking pin 47Y is lifted to retract into the locking pin body 47Ya, the door 45Y is unlocked and allowed to be open, so that the door 45Y can be opened by operating the operation member 46Y.

[Detection of Opening/Closing of Door]

Figure 8B:
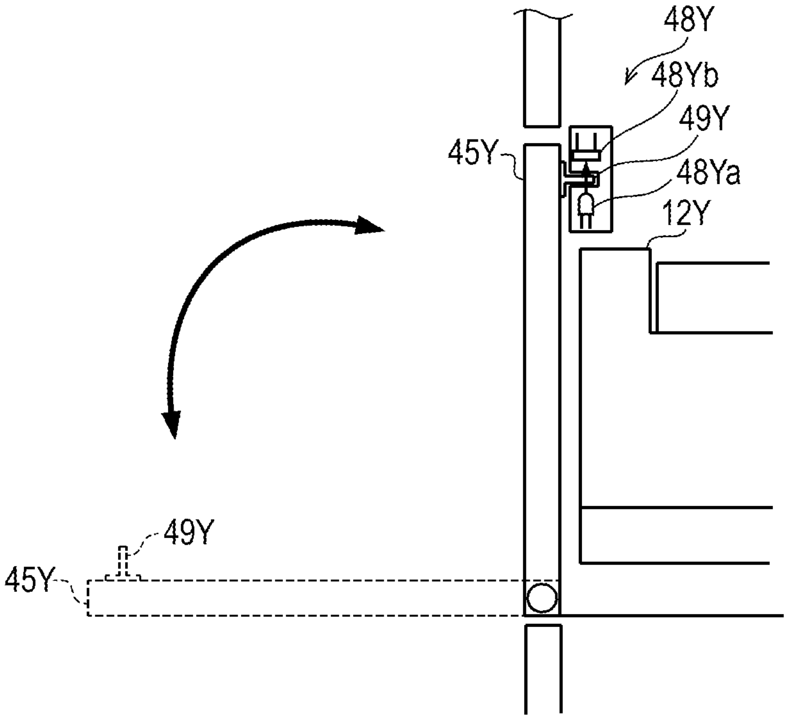
FIG. 8B is a cross-sectional view illustrating detection of opening/closing of the door.

FIG. 8B is a cross-sectional view at the position of the open/close sensor 48Y, illustrating the cartridge 12Y and the configuration of detection of the opening/closing of the door 45Y. The open/close sensor 48Y may be implemented with, for example, a photointerrupter. For example, the open/close sensor 48Y includes a light emission unit 48Ya that emits light and a light reception unit 48Yb that receives the light emitted from the light emission unit 48Ya. When the member 49Y is inserted in the open/close sensor 48Y, the light emitted from the light emission unit 48Ya is blocked by the member 49Y and therefore not received by the light reception unit 48Yb. Accordingly, the open/close sensor 48Y detects that the door 45Y is closed. The information detected by the open/close sensor 48Y is provided to the control unit 81 to be described later. In contrast, when the member 49Y is not inserted in the open/close sensor 48Y, the light emitted from the light emission unit 48Ya is received by the light reception unit 48Yb without being blocked by the member 49Y. Accordingly, the open/close sensor 48Y detects that the door 45Y is open.

[Control Configuration]

Figure 9:
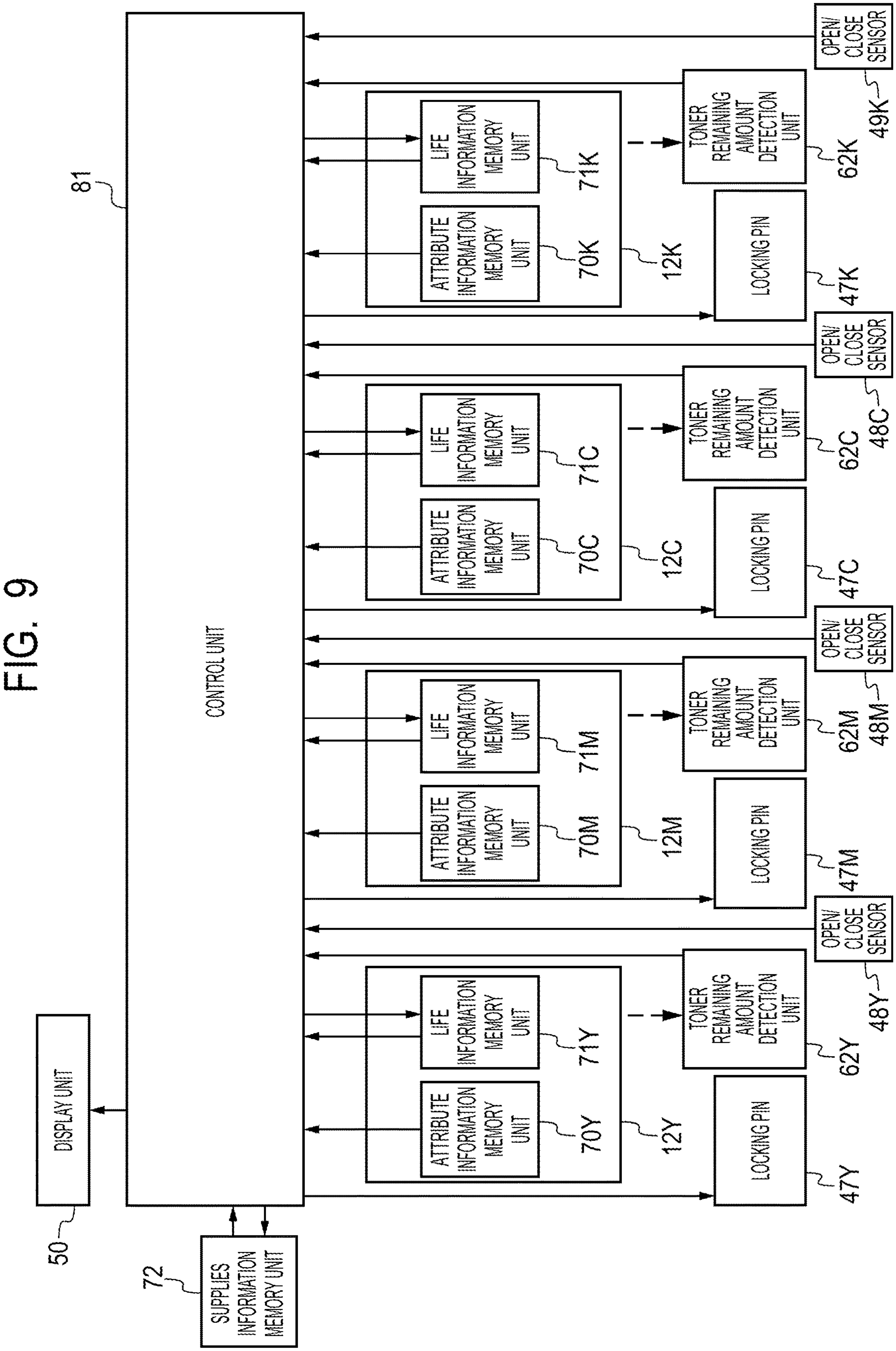
FIG. 9 is a block diagram illustrating a control configuration in the second embodiment.

FIG. 9 is a block diagram of the control configuration in the second embodiment. The control unit 81 includes components such as a CPU and is responsible for management of information about the cartridges 12 and management of the lives of the cartridges 12, as well as output control for the door locking mechanism, and detection with the open/close sensors 48. The control unit 81 performs control of the locking pins 47Y, 47M, 47C and 47K (protrusion and retraction of the member 47Yb) and detection with the open/close sensors 48Y, 48M, 48C and 48K. Other components are similar to the components in the first embodiment; the same components are given the same reference signs and will not be described.

Figure 10:
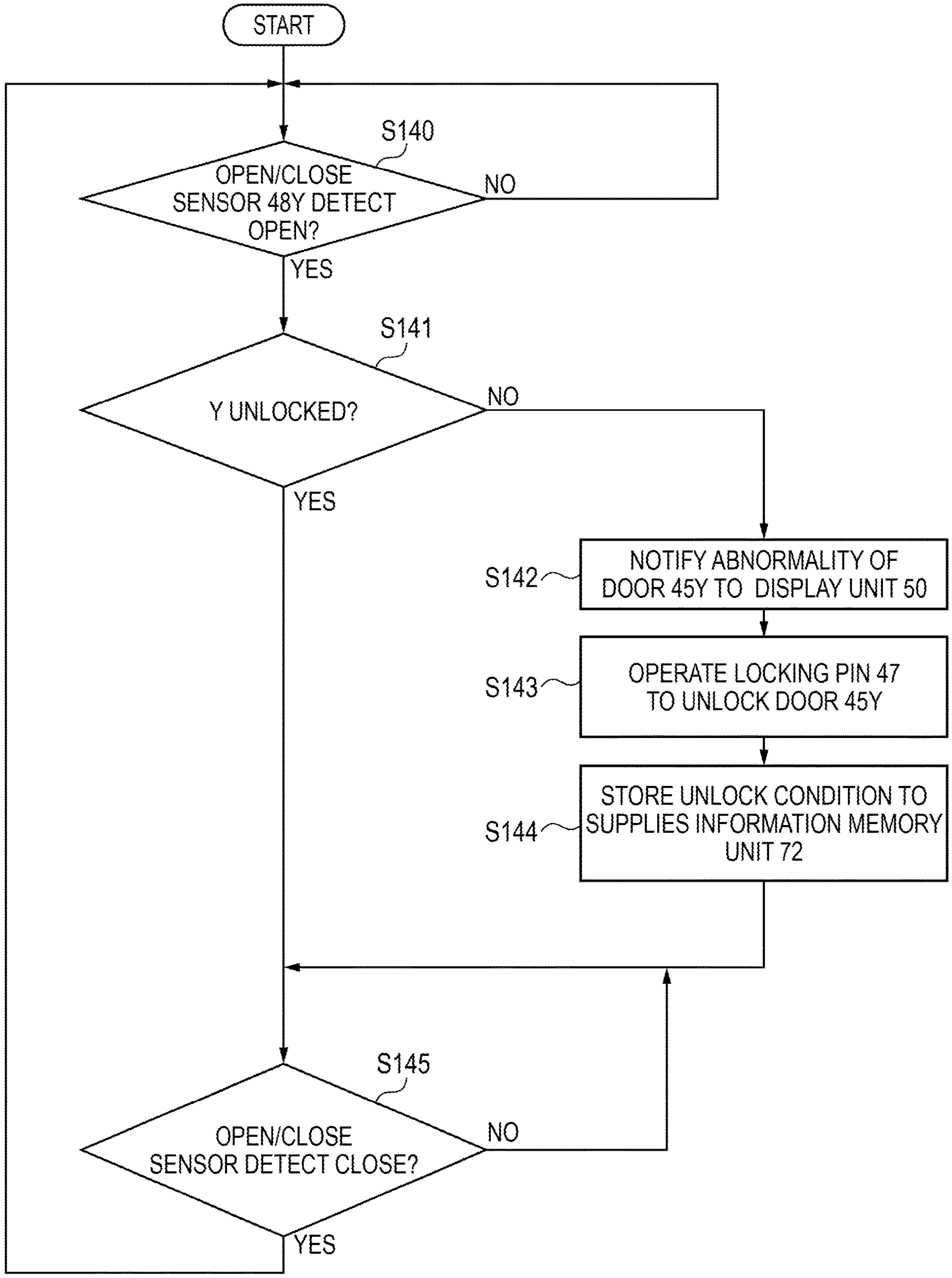
FIG. 10 is a flowchart illustrating an unlocking process in the second embodiment.

The method of handling the door locking mechanism by the control unit 81 will now be described with reference to the flowchart in FIG. 10. The flowchart in FIG. 10 illustrates a process in which, if the door 45 is detected as being open although the locking pin 47 is in the locking state, notification of an abnormality of the door 45 for accessing the cartridge 12 is provided and further the door 45 is unlocked. The process in the second embodiment will be described for the case in which the door 45Y of the cartridge 12Y is open. The same process also applies to the other cartridges 12M, 12C and 12K.

In S140, the control unit 81 continuously checks whether or not the door 45Y is in the open state (open) based on the result of detection by the open/close sensor 48Y. If the control unit 81 determines in S140 that the door 45Y is open based on the result of detection by the open/close sensor 48Y, the control unit 81 advances the process to S141, while if the control unit 81 determines in S140 that the door 45Y is not open, the control unit 81 returns the process to S140. In S141, the control unit 81 checks the lock state of the door 45Y for Y stored in the supplies information memory unit 72 (see Table 3) to determine whether or not the door 45Y is in the unlocked state. If the control unit 81 determines in S141 that the door 45Y is in the unlocked state according to the information in the supplies information memory unit 72, the control unit 81 advances the process to S145. In this case, the unlocked state stored in the supplies information memory unit 72 matches the open state of the door 45Y detected by the open/close sensor 48Y If the control unit 81 determines in S141 that the door 45Y is in the locked state according to the information in the supplies information memory unit 72, the control unit 81 advances the process to S142.

S142 and the following steps are the process in which the result of detection by the open/close sensor 48Y indicates that the door 45Y is open although the information in the supplies information memory unit 72 indicates that the door 45Y is locked. In S142, the control unit 81 provides a notification of an abnormality of the door 45Y on the display unit 50. Here, the abnormality of the door 45Y may include a malfunction of the locking pin 47 and a malfunction of the open/close sensor 48. In S143, the control unit 81 operates the locking pin 47Y to unlock the door 45Y. Specifically, the control unit 81 causes the member 47Yb to retract inside the locking pin body 47Ya so that the door is unlocked and allowed to be open. In S144, the control unit 81 stores the locked state of Y in the supplies information memory unit 72 and advances the process to S145.

In S145, the control unit 81 continuously checks whether or not the door 45Y is in the closed state (closed) based on the result of detection by the open/close sensor 48Y If the control unit 81 determines in S145 that the door 45Y is not closed, the control unit 81 returns the process to S145. If the control unit 81 determines in S145 that the door 45Y is closed, the control unit 81 returns the process to S140.

In the second embodiment, if the open/closed state of the door 45 based on the result of detection by the open/close sensor 48 is different from the lock state of the door 45 stored in the supplies information memory unit 72, it is determined that the door locking mechanism or the open/close sensor 48 is malfunctioning. The control unit 81 provides a notification of the abnormality of the door 45 and unlocks the door 45. This prevents the malfunctioning door 45 from being kept locked and hindering the removal of the cartridge 12. Also, if the cartridge is replaced while the door is malfunctioning, the user may be prompted to reinsert the still alive original cartridge.

Thus, according to the second embodiment, usability related to the locking mechanism for the replaceable units can be improved.

In a third embodiment, operations will be described in a configuration in which the apparatus has a single door common to the cartridges 12Y, 12M, 12C and 12K; the door includes a locking mechanism that restricts the removal of the cartridges, and further a sensor that detects the opening/closing of the door. The same components as described in the first and second embodiments will be given the same reference numerals and not be described.

[Door Configuration]

Figure 11:
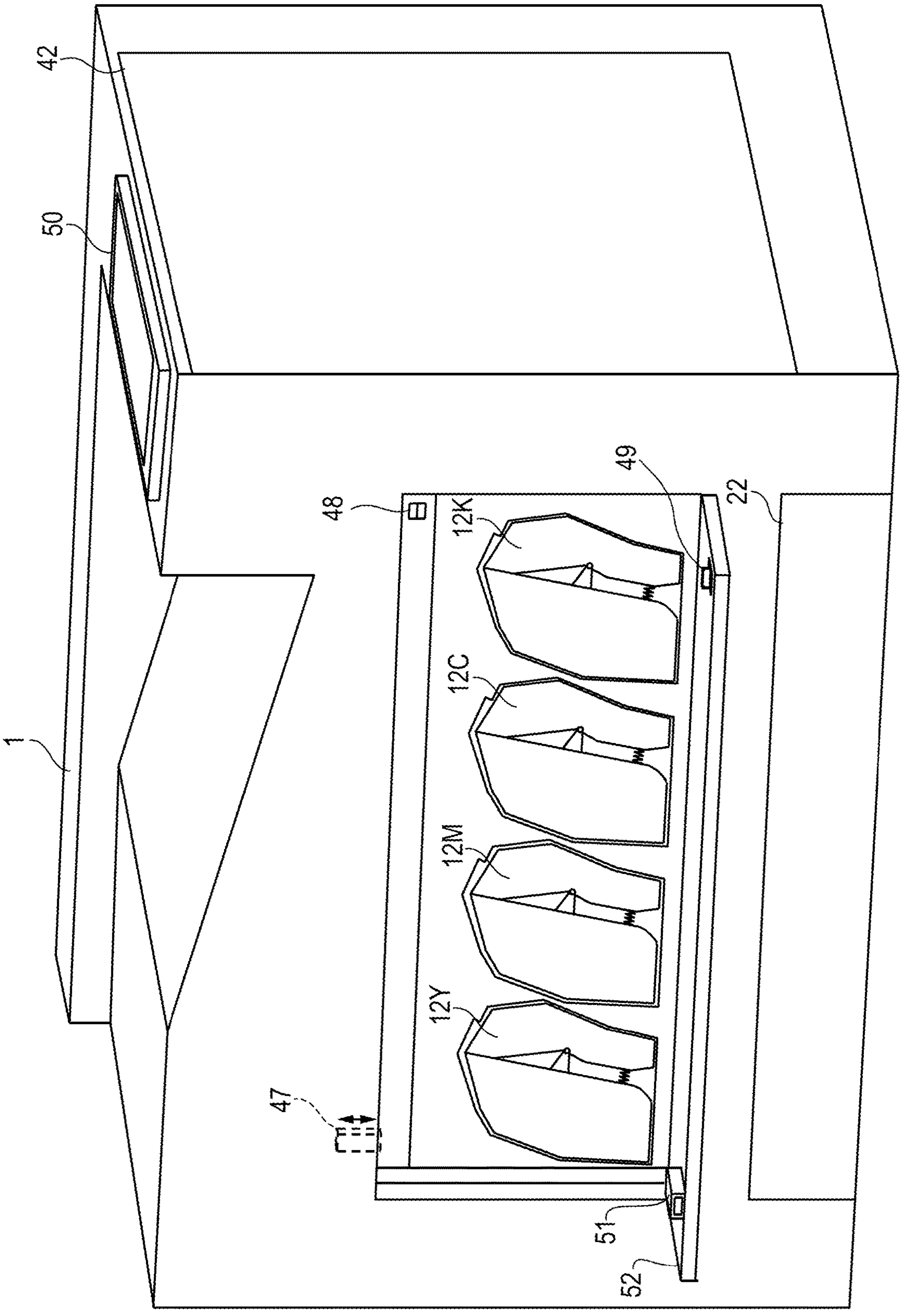
FIG. 11 is a perspective view illustrating a door configuration when a door is open in the third embodiment.

The insertion configuration of the cartridges 12 and the door configuration in the third embodiment will be described with reference to FIG. 11. FIG. 11 is a schematic perspective view of a printer, which is the image forming apparatus in which the cartridges 12 can be inserted into and removed from the body 1 of the image forming apparatus. FIG. 11 shows a single door 52 provided for all cartridges 12, which is open. A locking pin 47 restricts the movement of the door 52 toward the open state. A locking member 51 is paired with the locking pin 47 to hold the door 52 closed. When the locking pin 47 is in the protruding state, the locking pin 47 engages with the locking member 51 to hold the door 52 closed. The door 52 held closed inhibits the user from removing the cartridges 12Y, 12M, 12C and 12K. The locking pin 47 is controlled by a control unit 91 (to be described later) to either allow the door 52 to be open or hold the door 52 closed.

An open/close sensor 48, which is a first detection unit, detects the open/closed state of the door 52. A member 49 is a member for the open/close sensor 48 to detect the open/closed state of the door 52. The cartridges 12 can be removed when the door 52 is in the state shown in FIG. 11. In the third embodiment, release of the locking mechanism of the door 52 enables replacement of the cartridges 12. Therefore, the door 52 is allowed to be open if at least one of the cartridges 12 reaches the life end. The door lock configuration and the open/close sensor configuration are the same as in the second embodiment and will not be described.

[Control Configuration]

Figure 12:
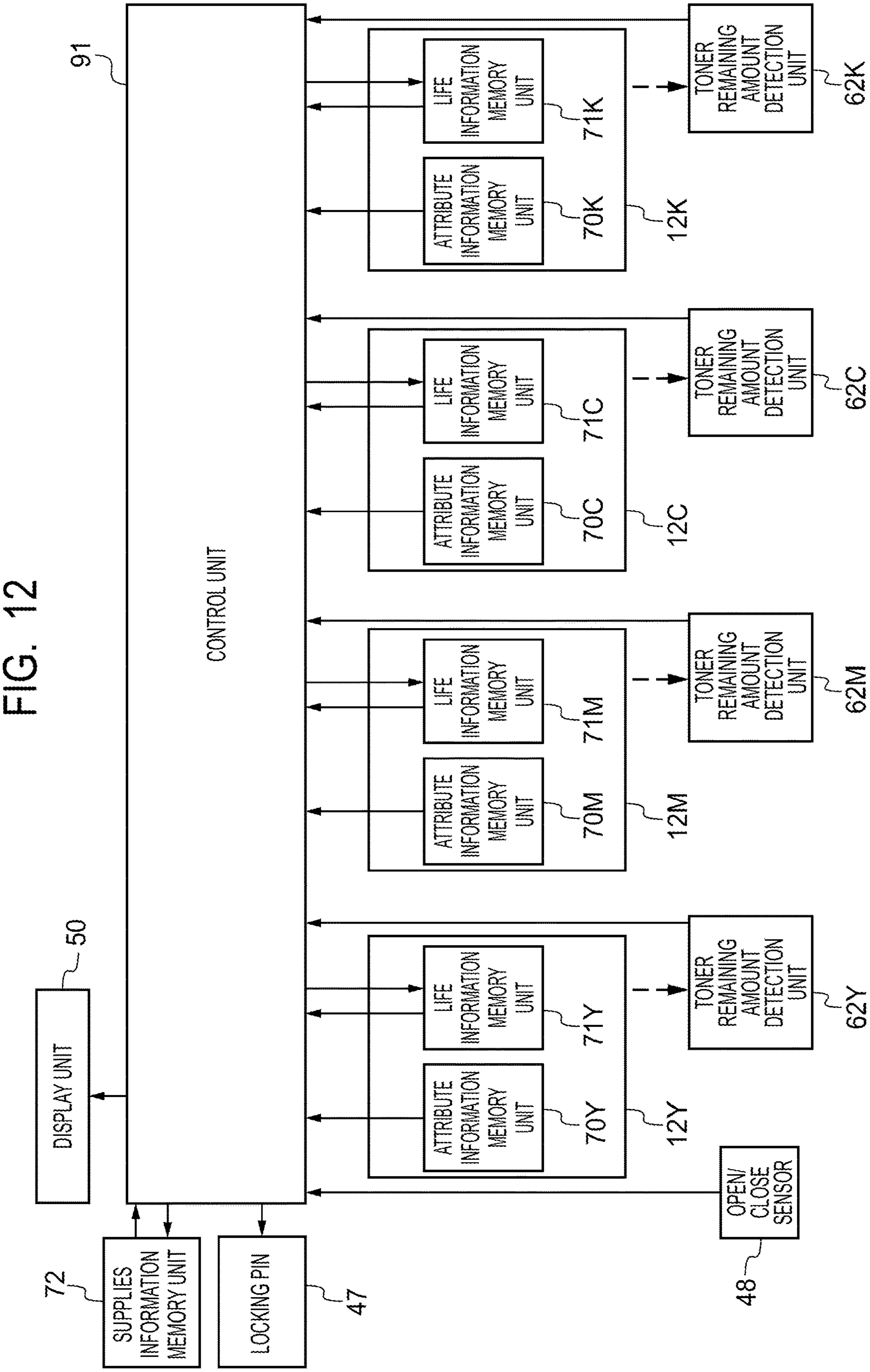
FIG. 12 is a block diagram illustrating a control configuration in the third embodiment.

FIG. 12 is a block diagram of the control configuration in the third embodiment. The control unit 91 includes components such as a CPU and is responsible for management of information about the cartridges 12 and management of the lives of the cartridges 12, as well as output control for the door locking mechanism of the door 52, and detection with the open/close sensor 48. The control unit 91 performs output control for the locking pin 47 and detection of the opening/closing of the door 52 with the open/close sensor 48. Other components are similar to the components in the first and second embodiments; the same components are given the same reference signs and will not be described.

[Locking Mechanism]

Figure 13:
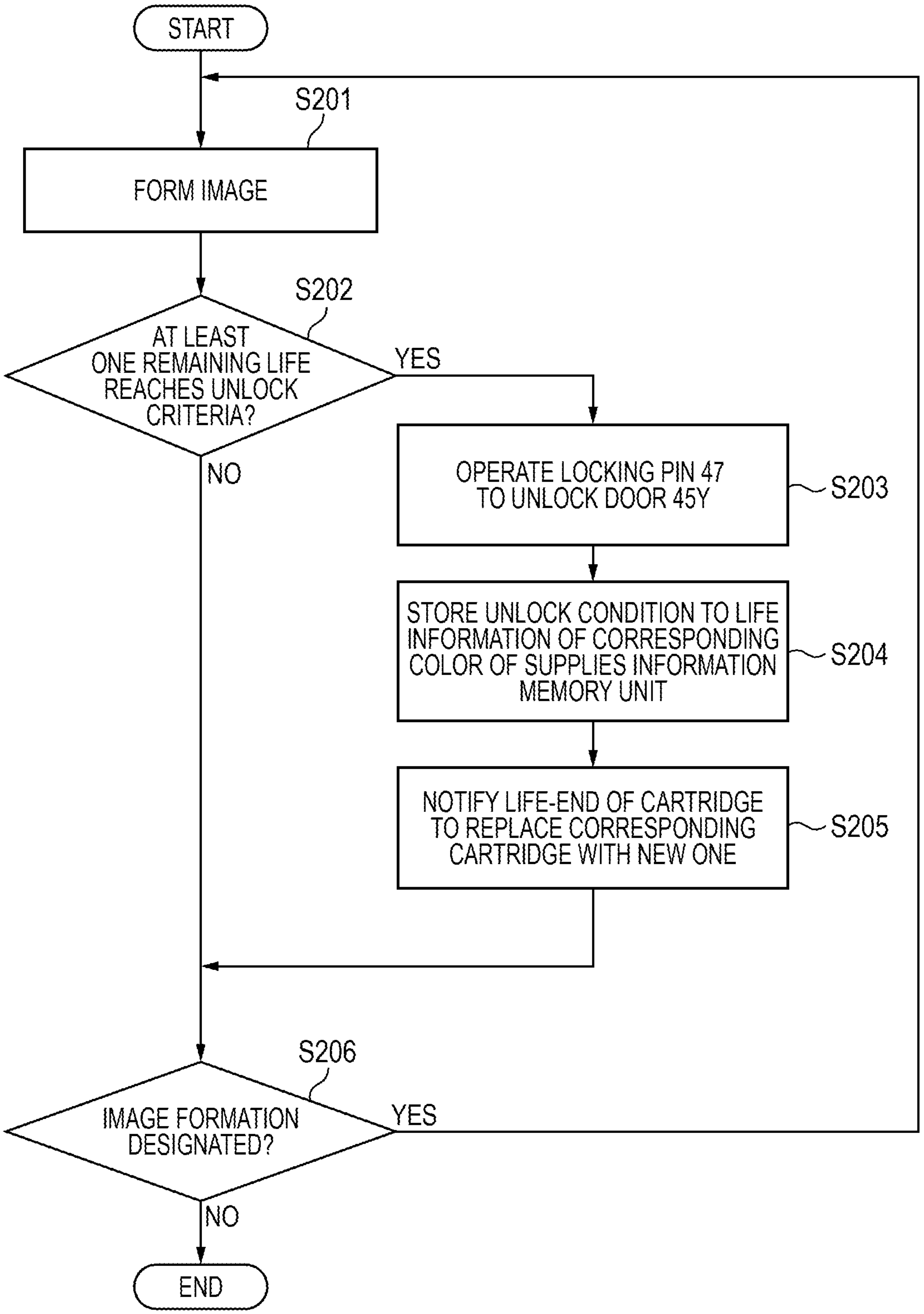
FIG. 13 is a flowchart illustrating an unlocking process in the third embodiment.

The method of handling the locking mechanism for the cartridges 12 by the control unit 91 will now be described with reference to FIGS. 13 to 15. The flowchart in FIG. 13 illustrates the process of the normal release of the locking mechanism, in which the door 52 is unlocked if the remaining amount of at least one cartridge 12 falls to or less than a predetermined value during image forming.

Upon receiving an image forming designation, the control unit 91 starts the process beginning in S201. In S201, the control unit 91 forms an image. In S202, during or after the image forming, the control unit 91 determines whether or not the remaining life of at least one cartridge 12 reaches the value of the unlocking criterion for unlocking the door 52. If the control unit 91 determines in S202 that the remaining life reaches the criterion for unlocking the door 52, the control unit 91 advances the process to S203, while if the control unit 91 determines in S202 that the remaining life has not yet reached the criterion for unlocking the door 52, the control unit 91 advances the process to S206.

In S203, the control unit 91 operates the locking pin 47 to unlock the door 52. In S204, for the lock state of the cartridge 12 of the color determined as reaching the life end, the control unit 91 stores information indicating the unlocked state (for example, "unlocked") in Table 3 in the supplies information memory unit 72. In the third embodiment, the life information memory unit 71 of each cartridge 12 has an area for storing lock information, and the control unit 91 stores the unlocked state in the life information memory unit 71 of the cartridge 12 of the color reaching the life end. In S205, the control unit 91 provides, on the display unit 50, a notification of the life end of the cartridge 12 and a prompt to replace the cartridge 12 of the color reaching the life end with a new cartridge, and advances the process to S206. In S206, the control unit 91 determines whether or not a further image forming designation is received. If the control unit 91 determines in S206 that a further image forming designation is received, the control unit 91 returns the process to S201, while if the control unit 91 determines in S206 that a further image forming designation has not yet been received, the control unit 91 terminates the image forming operation.

[Control to Set and Release Locking Mechanism, e.g., upon Power-On]

Figure 14:
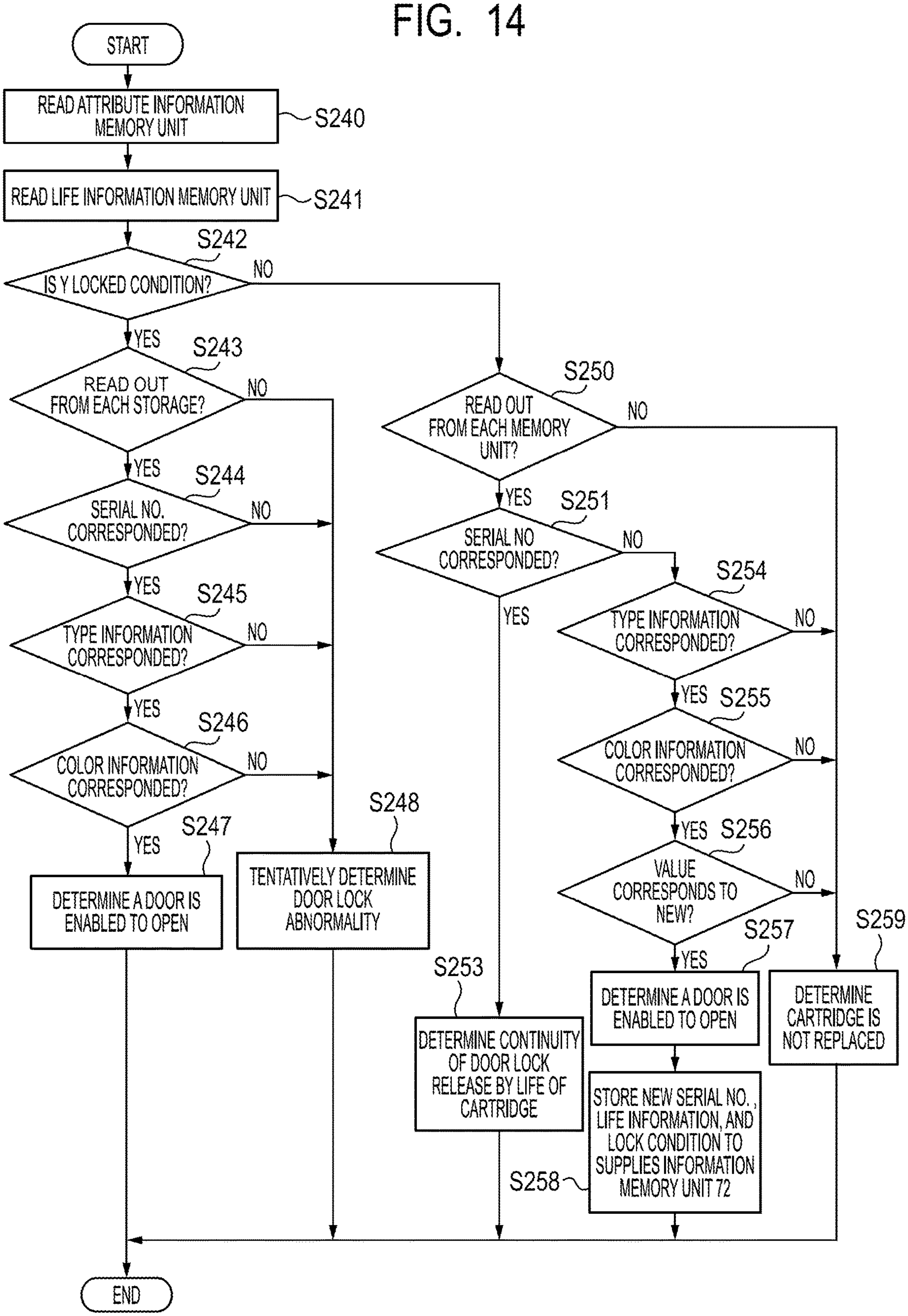
FIG. 14 is a flowchart illustrating a lock determination process in the third embodiment.

The flowchart in FIG. 14 illustrates operations performed by the control unit 91 for confirming the lock state of the door 52 for the cartridge 12Y when the power is turned on or when the door 52 is in the closed state. The flowchart in FIG. 14 is called by the flowchart in FIG. 15 to be described later. While the yellow cartridge 12Y is described here as a representative example, the same process also applies to the other cartridges 12M, 12C and 12K.

In S240, the control unit 91 reads, from the cartridge 12Y, the information stored in the attribute information memory unit 70Y. In S241, the control unit 91 reads, from the cartridge 12Y, the information stored in the life information memory unit 71Y. In S242, the control unit 91 determines whether or not the lock state of Y in the supplies information memory unit 72 (see Table 3) is set in the locked state. If the control unit 91 determines in S242 that the lock state is set in the locked state, the control unit 91 advances the process to S243, while if the control unit 91 determines in S242 that the lock state is not set in the locked state, the control unit 91 advances the process to S250.

S243 and the following steps are the process of determining whether the cartridge 12 has been replaced while the door 52 is locked. In S243, the control unit 91 determines whether or not the information was able to be read from the attribute information memory unit 70Y and the life information memory unit 71Y. If the control unit 91 determines in S243 that the information was successfully read from these memory units, the control unit 91 advances the process to S244, while if the control unit 91 determines in S243 that the information was not able to be read from these memory units, the control unit 91 advances the process to S248.

In S244, the control unit 91 determines whether or not the serial No. read from the attribute information memory unit 70Y matches the serial No. of Y stored in the supplies information memory unit 72. If the control unit 91 determines in S244 that the serial Nos. match each other, the control unit 91 advances the process to S245, while if the control unit 91 determines in S244 that the serial Nos. do not match each other, the control unit 91 advances the process to S248. In S245, the control unit 91 determines whether or not the machine type information (see Table 1) stored in the attribute information memory unit 70Y matches the machine type information stored in the control unit 91. If the control unit 91 determines in S245 that the machine type information matches each other, the control unit 91 advances the process to S246, if the control unit 91 determines in S245 that the machine type information does not match each other, the control unit 91 advances the process to S248. In S246, the control unit 91 determines whether or not the cartridge color information (see Table 1) stored in the attribute information memory unit 70Y indicates Y, i.e., whether the color information matches the color of interest. If the control unit 91 determines in S246 that the color information indicates Y (matches the color of interest), the control unit 91 advances the process to S247 as normal start-up without performing lock processing. If the control unit 91 determines in S246 that the color information does not indicate Y, i.e., is a color other than Y (does not match the color of interest), the control unit 91 advances the process to S248. In S247, the control unit 91 determines that the door is locked and the cartridge 12Y has been unchanged since the previous process. Therefore, the control unit 91 determines that the door can be kept locked for the cartridge 12Y and returns the process to FIG. 15 to be described later. In S248, the control unit 91 determines that the cartridge 12 has been replaced although the door 52 is locked, or tentatively determines a door lock abnormality, and returns the process to the process flow of FIG. 15 to be described later.

S250 and the following steps are the process in the unlocked state, describing the determination to operate the lock to exit the unlocked state. In S250, the control unit 91 determines whether or not the information was successfully read from the attribute information memory unit 70Y and the life information memory unit 71Y. If the control unit 91 determines in S250 that the information was able to be read from these memory units, the control unit 91 advances the process to S251, while if the control unit 91 determines in S250 that the information was not able to be read from these memory units, the control unit 91 advances the process to S259. In S251, the control unit 91 determines whether or not the serial No. read from the attribute information memory unit 70Y matches the serial No. of Y stored in the supplies information memory unit 72. If the control unit 91 determines in S251 that the serial Nos. match each other, the control unit 91 advances the process to S253, while if the control unit 91 determines in S251 that the serial Nos. do not match each other, the control unit 91 advances the process to S254. In S253, the control unit 91 determines that the cartridge 12Y has reached the life end but not yet been replaced with a new cartridge. Therefore, the control unit 91 maintains the unlocked state of the door 52 caused by the life end of the cartridge 12Y, and returns the process to FIG. 15 to be described later.

S254 and the following steps are the process in the case where the cartridge 12 has been replaced while the door is unlocked. In S254, the control unit 91 determines whether or not the machine type information stored in the attribute information memory unit 70Y matches the machine type information stored in the control unit 91. If the control unit 91 determines in S254 that the machine type information matches each other, the control unit 91 advances the process to S255, if the control unit 91 determines in S254 that the machine type information does not match each other, the control unit 91 advances the process to S259. In S255, the control unit 91 determines whether or not the cartridge color information stored in the attribute information memory unit 70Y indicates Y (whether the color information matches the color of interest). If the control unit 91 determines in S255 that the color information matches the color of interest, the control unit 91 advances the process to S256, while if the control unit 91 determines in S255 that the color information does not match the color of interest, the control unit 91 advances the process to S259.

In S256, the control unit 91 determines whether or not the cartridge 12 is a new cartridge based on the information stored in the life information memory unit 71Y (see Table 2). Here, the control unit 91 determines that the cartridge 12 is a new cartridge if the total rotation time of the photosensitive drum 13Y and the total rotation distance of the photosensitive drum 13Y stored in the life information memory unit 71Y are equal to or less than predetermined values, respectively, or if the remaining life equals or exceeds a predetermined value near 100%. If the control unit 91 determines in S256 that the cartridge 12 is a new cartridge, the control unit 91 advances the process to S257, if the control unit 91 determines in S256 that the cartridge 12 is not a new cartridge, the control unit 91 advances the process to S259.

In S257, the control unit 91 determines that a new cartridge has been inserted after the unlocking and that the door can therefore be locked. In S258, the control unit 91 overwrites the serial No. of Y stored in the supplies information memory unit 72 with the value of the serial No. stored in the attribute information memory unit 70Y. The control unit 91 also overwrites the life information about Y stored in the supplies information memory unit 72 with the value stored in the life information memory unit 71Y. The control unit 91 further stores the value indicating the locked state in the lock state of Y in the supplies information memory unit 72 and returns the process to FIG. 15 to be described later. In S259, the control unit 91 determines that a new cartridge has not been inserted (the original cartridge has not been replaced) although the door 52 is unlocked, and returns the process to FIG. 15.

Figure 15:
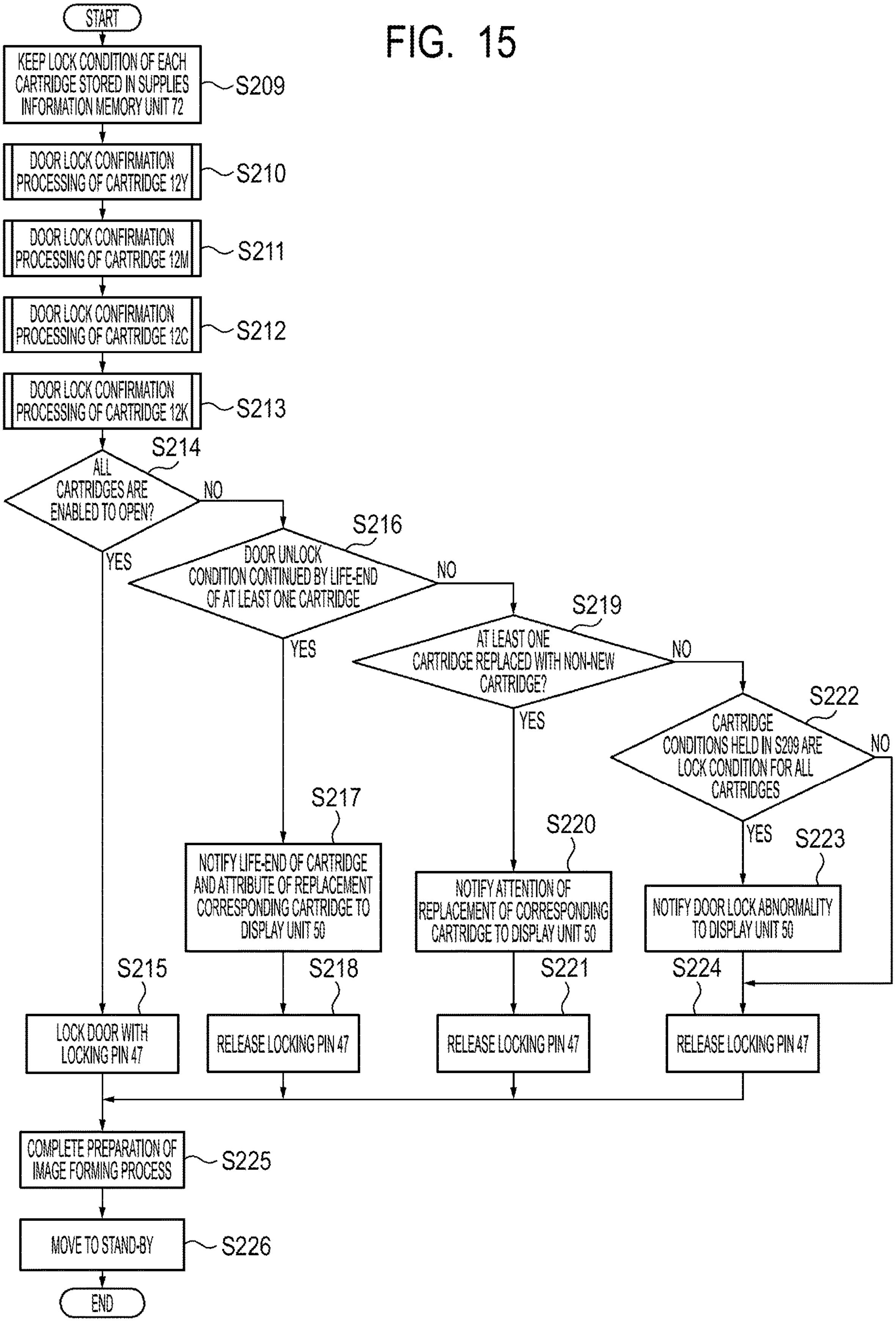
FIG. 15 is a flowchart illustrating an unlocking process in the third embodiment.

The flowchart in FIG. 15 illustrates operations performed by the control unit 91 for locking or unlocking the door for the cartridges 12Y, 12M, 12C and 12K when the power is turned on or when the door 52 is in the closed state. In S209, the control unit 91 reads the information about the lock state of each cartridge 12 from the supplies information memory unit 72 and saves the read information. In S210, the control unit 91 performs the door lock confirmation processing for the cartridge 12Y described in FIG. 14. In S211, the control unit 91 performs the door lock confirmation processing for the cartridge 12M by applying the processing described in FIG. 14 to magenta. In S212, the control unit 91 performs the door lock confirmation processing for the cartridge 12C by applying the processing described in FIG. 14 to cyan. In S213, the control unit 91 performs the door lock confirmation processing for the cartridge 12K by applying the processing described in FIG. 14 to black. While performing the processing in S210 to S213, the control unit 91 stores the results of determination in association with the corresponding colors. For example, if it is determined that "the door can be locked" for the yellow cartridge 12Y, the determination is stored in association with yellow.

The process starting in S214 branches depending on the results of determination in the door lock confirmation processing for the cartridges 12 performed in S210 to S213. In S214, the control unit 91 determines whether or not the door can be locked for all cartridges 12 according to the result of determination (S247 and S257 in FIG. 14). If the control unit 91 determines in S214 that the door can be locked for all cartridges 12 according to the results of determination, the control unit 91 advances the process to S215. In S215, the control unit 91 controls the locking pin 47 to lock the door. If the control unit 91 determines in S214 that the door cannot be locked for at least one of the cartridges 12 according to the results of determination, the control unit 91 advances the process to S216.

In S216, the control unit 91 determines whether or not at least one cartridge 12 reaches the life end and the resulting unlocked state of the door should be maintained according to the results of determination (S253 in FIG. 14). If the control unit 91 determines in S216 that at least one cartridge 12 reaches the life end, the control unit 91 advances the process to S217. In S217, the control unit 91 causes the display unit 50 to display the life end of the cartridge 12 and a prompt to replace the cartridge 12 of the color reaching the life end. In S218, the control unit 91 releases the locking pin 47 and advances the process to S225. If the control unit 91 determines in S216 that no cartridge 12 reaches the life end and the door should not be kept unlocked according to the results of determination, the control unit 91 advances the process to S219.

In S219, the control unit 91 determines whether or not at least one cartridge 12 has been replaced with a cartridge that is not new. If the control unit 91 determines in S219 that at least one cartridge 12 has been replaced with a cartridge that is not new (S259 in FIG. 14), the control unit 91 advances the process to S220. In S220, the control unit 91 causes the display unit 50 to display a prompt to replace the cartridge because the cartridge is not new. In S221, the control unit 91 releases the locking pin 47 and advances the process to S225. If the control unit 91 determines in S219 that no cartridge 12 has been replaced with a cartridge that is not new, the control unit 91 advances the process to S222.

S222 and the following steps are the process in the case where a tentative door lock abnormality is determined for at least one cartridge 12 in the processing in S248 in FIG. 14. In S222, the control unit 91 determines whether or not all cartridges 12 are in the locked state based on the lock state of each cartridge 12 read in S209. If the control unit 91 determines in S222 that all cartridges 12 are in the locked state, the control unit 91 makes the following determination; although the information in the supplies information memory unit 72 indicates the locked state for all colors, the door lock confirmation processing indicates that at least one cartridge 12 has been replaced. Therefore, the control unit 91 determines a malfunction of the locking mechanism and advances the process to S223. In S223, the control unit 91 provides a notification of a door lock abnormality on the display unit 50. The door lock abnormality may include an abnormality of the door locking mechanism and/or an abnormality of the open/close sensor 48. In S224, the control unit 91 releases the locking pin 47 and advances the process to S225. If the control unit 91 determines in S222 that at least one cartridge 12 is in the unlocked state, the control unit 91 advances the process to S224. In S225, the control unit 91 is prepared for an image forming process and advances to S226, where the control unit 91 moves to stand-by mode capable of image forming and terminates the process.

As described above, in the third embodiment, a malfunction of the locking mechanism is determined and the door is unlocked even in the case where the single door 52 is used to manage the removal of the multiple cartridges 12. This prevents the malfunctioning door 52 from being kept locked and hindering the removal of any of the cartridges 12. Also, if the cartridge 12 is replaced while the door lock is malfunctioning, the user may be prompted to reinsert the still alive original cartridge 12.

Thus, according to the third embodiment, usability related to the locking mechanism for the replaceable units can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-034928, filed Feb. 28, 2018, which is hereby incorporated by reference herein in its entirety.

What is claimed is:

1. An image forming apparatus for forming an image on a recording material, comprising:

a cartridge detachably mounted to a main body of the image forming apparatus, the cartridge having a first memory configured to store information regarding the cartridge;

a door movable between an open state in which access to the cartridge mounted to the main body is allowed and a closed state in which access to the cartridge mounted to the main body is prevented;

a locking member movable between a first position as a locked state in which the door in the closed state is locked in the closed state and a second position as an unlocked state in which the door in the closed state is not locked in the closed state;

a control unit configured to switch a state of the locking member between the locked state and the unlocked state; and a second memory configured to store information regarding the locked state and information regarding the mounted cartridge, wherein in a case in which the control unit refers to the information in the second memory and the information regarding the locked state indicates that a state of the locking member is the locked state, and the control unit refers to the information regarding the cartridge obtained from the first memory of the cartridge mounted to the main body and the information regarding the mounted cartridge stored in the second memory, and the information from the first memory and the information from the second memory indicate different cartridges, the control unit controls a position of the locking member to be the second position.

2. The image forming apparatus according to claim 1, further comprising a display unit configured to display information, wherein further to controlling the position of the locking member to be the second position, the control unit controls the display unit to indicate information regarding an abnormality of a switching mechanism configured to switch a state of the locking member by the control unit.

3. The image forming apparatus according to claim 1, wherein in a case in which the control unit refers to the information stored in the first memory and the information is regarding a life of the cartridge, and the control unit determines that the life of the cartridge is equal to or less than a predetermined value, the control unit controls a position of the locking member to be the second position.

4. The image forming apparatus according to claim 3, wherein further to controlling the position of the locking member to be the second position, the control unit controls to store information in the second memory that the cartridge is in the unlocked state.

5. The image forming apparatus according to claim 1, wherein the door comprises an engagement member to engage the locking member, and wherein the locking member moves to the first position to perform an engagement between the locking member and the engagement member, and the locking member moves to the second position to release the engagement between the locking member and the engagement member.

6. The image forming apparatus according to claim 1, comprising a plurality of cartridges, and wherein the door is movable between the open state in which access to the plurality of the cartridges mounted to the main body is allowed and the closed state in which access to the plurality of the cartridges mounted to the main body is prevented.

7. The image forming apparatus according to claim 1, wherein the information regarding the cartridge includes a serial number and information regarding the image forming apparatus to which the cartridge can be mounted.

8. The image forming apparatus according to claim 1, wherein the cartridge includes:

toner;

a photosensitive member on to which an electrostatic latent image is formed; and a development unit configured to develop the electrostatic latent image on the photosensitive member and form a toner image by the toner.

9. The image forming apparatus according to claim 8, further comprising a remaining amount detection unit configured to detect a remaining amount of the toner, wherein when an image forming operation is performed, the control unit stores at least a cumulative rotation time according to a rotation of the photosensitive member, a cumulative rotation distance according to a rotation of the photoconductor, and a remaining amount of the toner detected by the remaining amount detection unit in the first memory, and calculates a life of the cartridge according to the cumulative rotation time, the cumulative rotation distance, and the remaining amount of the toner stored in the first memory.

* * * * *